United States Patent
Antonsson

(10) Patent No.: US 11,283,646 B2
(45) Date of Patent: Mar. 22, 2022

(54) MONITORING LOCAL INTERCONNECT NETWORK (LIN) NODES

(71) Applicant: Volvo Car Corporation, Gothenburg (SE)

(72) Inventor: Anders Antonsson, Västra Frölunda (SE)

(73) Assignee: Volvo Car Corporation, Gothenburg (SE)

( * ) Notice: Subject to any disclaimer, the term of this patent is extended or adjusted under 35 U.S.C. 154(b) by 95 days.

(21) Appl. No.: 16/792,550

(22) Filed: Feb. 17, 2020

(65) Prior Publication Data

US 2020/0274734 A1 Aug. 27, 2020

(30) Foreign Application Priority Data

Feb. 22, 2019 (EP) ..................................... 19158878

(51) Int. Cl.
| | | |
|---|---|---|
| *H04L 12/44* | (2006.01) | |
| *H04L 12/413* | (2006.01) | |
| *H04L 1/00* | (2006.01) | |
| *H04L 12/40* | (2006.01) | |

(52) U.S. Cl.
CPC ........ *H04L 12/4135* (2013.01); *H04L 1/0083* (2013.01); *H04L 2012/40234* (2013.01); *H04L 2012/40273* (2013.01)

(58) Field of Classification Search
USPC ............... 710/305, 306, 311, 312, 316, 317; 370/285, 362–368, 401–405
See application file for complete search history.

(56) References Cited

U.S. PATENT DOCUMENTS

| | | |
|---|---|---|
| 9,300,323 B2 | 3/2016 | Hartwich et al. |
| 10,277,598 B2 | 4/2019 | Kishikawa et al. |
| 2010/0067404 A1* | 3/2010 | Van Wageningen .. H04J 3/0694 370/254 |
| 2013/0094353 A1 | 4/2013 | Monroe et al. |
| 2014/0157035 A1 | 6/2014 | Vowe |

(Continued)

FOREIGN PATENT DOCUMENTS

| | | |
|---|---|---|
| CN | 103748571 A | 4/2014 |
| CN | 106031098 A | 10/2016 |
| EP | 2339790 A1 | 6/2011 |

OTHER PUBLICATIONS

Extended Search Report from counterpart European Application No. 19158878.9, dated Jul. 4, 2019, 8 pp.

(Continued)

*Primary Examiner* — Ilwoo Park
(74) *Attorney, Agent, or Firm* — Shumaker & Sieffert, P.A.

(57) ABSTRACT

The present disclosure relates to a method of monitoring Local Interconnect Network (LIN) nodes and a monitoring device performing the method. In an aspect a method of a monitoring device of monitoring a plurality of LIN buses is provided, wherein at least one LIN node is connected to each LIN bus, said plurality of LIN buses being interconnected via the monitoring device. The method comprises detecting, for each LIN bus, any dominant data being sent over said each LIN bus by a LIN node connected to said each LIN bus and routing said any dominant data received by the monitoring device over said each LIN bus to all remaining LIN buses without overwriting any dominant data sent over the remaining LIN buses.

18 Claims, 14 Drawing Sheets

(56) References Cited

U.S. PATENT DOCUMENTS

2014/0355622 A1* 12/2014 Kishigami ............ H04L 12/403
                                                                370/445
2015/0172298 A1   6/2015 Otsuka
2015/0339254 A1  11/2015 Hartwich
2017/0359195 A1* 12/2017 Bender ................. H04L 12/403
2020/0183873 A1*  6/2020 Reidt .................. G06F 13/4282

OTHER PUBLICATIONS

"LIN Specification Package, Revision 2.0," LIN Consortium, Sep. 23, 2003, 125 pp.

"Road vehicles—Controller area network (CAN)—Part 2: High-speed medium access unit," International Standard: ISO 11898-2, Second edition, Dec. 15, 2016, 38 pp.

"Road vehicles—Local Interconnect Network (LIN)—Part 3: Protocol specification," Swedish Standards Institute; Svensk Standard: ISO 17987-3, Oct. 21, 2016, 60 pp.

"Road vehicles—Local Interconnect Network (LIN)—Part 4: Electrical physical layer (EPL) specification 12 V / 24 V," Swedish Standards Institute; Svensk Standard: ISO 17987-4, Oct. 21, 2016, 40 pp.

"TI Designs: TIDA-01487 Isolated CAN FD Repeater Reference Design," Texas Instruments, Apr. 2018, 17 pp.

"Road vehicles—Local Interconnect Network (LIN)—Part 7: Electrical Physical Layer (EPL) conformance test specification," Swedish Standards Institute; Svensk Standard: ISO 17987-7, Jan. 17, 2017, 188 pp.

Office Action dated Jul. 13, 2021 for corresponding CN Application No. 202010101109.X, 7 pgs.

* cited by examiner

MONITORING LOCAL INTERCONNECT NETWORK (LIN) NODES

CROSS REFERENCE

This application claims priority to European application no. 19158878.9 filed Feb. 22, 2019, the entire contents of which are hereby incorporated by reference.

TECHNICAL FIELD

The present disclosure relates to a method of monitoring Local Interconnect Network (LIN) nodes and a monitoring device performing the method.

BACKGROUND

The automotive industry is using message based communication protocols between electronic control units (ECUs) embedded in motor vehicles. An example of such a protocol is Local Interconnect Network (LIN). This protocol is standardized by International Standards Organization (ISO). For instance, the LIN protocol used in automotive is defined by ISO standard ISO 17987, consisting of several sub specifications addressing different parts; for example the LIN datalink layer is defined by ISO 17987-3 and LIN physical layer is defined by ISO 17987-4.

An important capability in design, verification and fault tracing of LIN communication are tools that can be used to analyse all communication protocol details. In particular tools that aid analysis of communication faults and errors. However, it is not only faults that can be of importance but rather finding the origin of a certain communication event. Analysing both expected and unexpected events can provide enhanced understanding of a LIN network. It may also be used as an early warning of any potential problem that may occur later on. Gathering the information, for instance the type of event and origin, for expected and unexpected events may be based on sampling the network communication for an amount of time or in certain operational modes. From that information a risk analysis can be made which can aid in addressing or dismissing further investigation towards certain parts of a LIN network.

Conventional state of the art LIN tools provide extensive analysis capabilities, but with ever increasing complexity of vehicle electrical systems there is an increasing risk for systems not behaving as expected, hence there is need for even more detailed analysis capabilities.

An important aspect of unexpected or even expected communication behaviours is to determine the root cause or origin. Having the capability to precisely determine the origin (e.g. a particular LIN ECU in a network of ECUs) of an unwanted behaviour can be especially valuable as this can reduce the total effort needed to find the root cause and make corrective actions. Another desired capability is to characterise an expected behaviour where some margin exist between actual behaviour and requirements or where requirements are loosely defined (e.g. accumulated count of error flags).

Reducing the total analysis effort usually mean that time and cost for detecting an unexpected behaviour, determining the origin of it, making corrective actions, and finally verifying the problem as solved, can be significantly reduced. Reducing time for resolving problems are often critical in the automotive industry.

For LIN there is at the datalink layer a possibility to detect faulty LIN frames by means of a checksum transmitted at the end of a LIN frame. A LIN node—in the form of e.g. an ECU—may determine that a received frame is corrupted if the checksum for the received frame does not match with a checksum calculated by the LIN node.

The reasons for LIN faults may be hardware or software (e.g. bugs, damaged components or even system design flaws) or environmental, such as EMI disturbance. Depending on type of fault, this can have widely different impacts on the electrical system ranging from no impact at all, slower system response, and system partly going to limp home mode, full or partial loss of system functionality or system start up- or shutdown problems. Problems can also vary over time in the same vehicle making them very hard to identify, reproduce, plan and implement corrective actions and verify those actions. It can be particularly difficult to identify and associate customer perceivable symptoms with a root cause in the electrical system. There may also be symptoms not noticeable by a customer but still being important or even making the vehicle not compliant to critical requirements.

Conventional LIN analysis tools that are connected in the conventional way directly and only to a LIN bus are unable to provide some analysis capabilities. The reason is the nature of the LIN physical layer itself. Determining several aspects about each ECU in a LIN network separately from the other ECUs may provide an improved understanding of the communication properties of that ECU. Having access to internal signalling inside LIN ECUs that would support detailed analysis may be difficult or inconvenient for several reasons. For instance, ECUs are normally not designed for external access to internal signals, so ECUs have to be opened or modified such that internal signals can be accessed. Further, ECUs may be difficult to access due to the inconspicuous positions in which they are mounted in the vehicle.

SUMMARY

One objective of the present invention is to solve, or at least mitigate, this problem in the art and thus to provided an improved method of monitoring a plurality of LIN nodes in the form of for instance ECUs of a motor vehicle.

This objective is attained by a monitoring device according to an embodiment. The monitoring device is configured to receive data over a plurality of LIN buses.

If dominant data bits are received by the monitoring device over any one or more of the plurality of LIN buses, the dominant data bits are routed over the remaining LIN buses at a voltage level interpreted by LIN nodes connected to the buses as being dominant, but which voltage level is configured such that the dominant data routed over the remaining buses by the monitoring device does not overwrite dominant data sent by one or more of the LIN nodes connected to the remaining buses.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
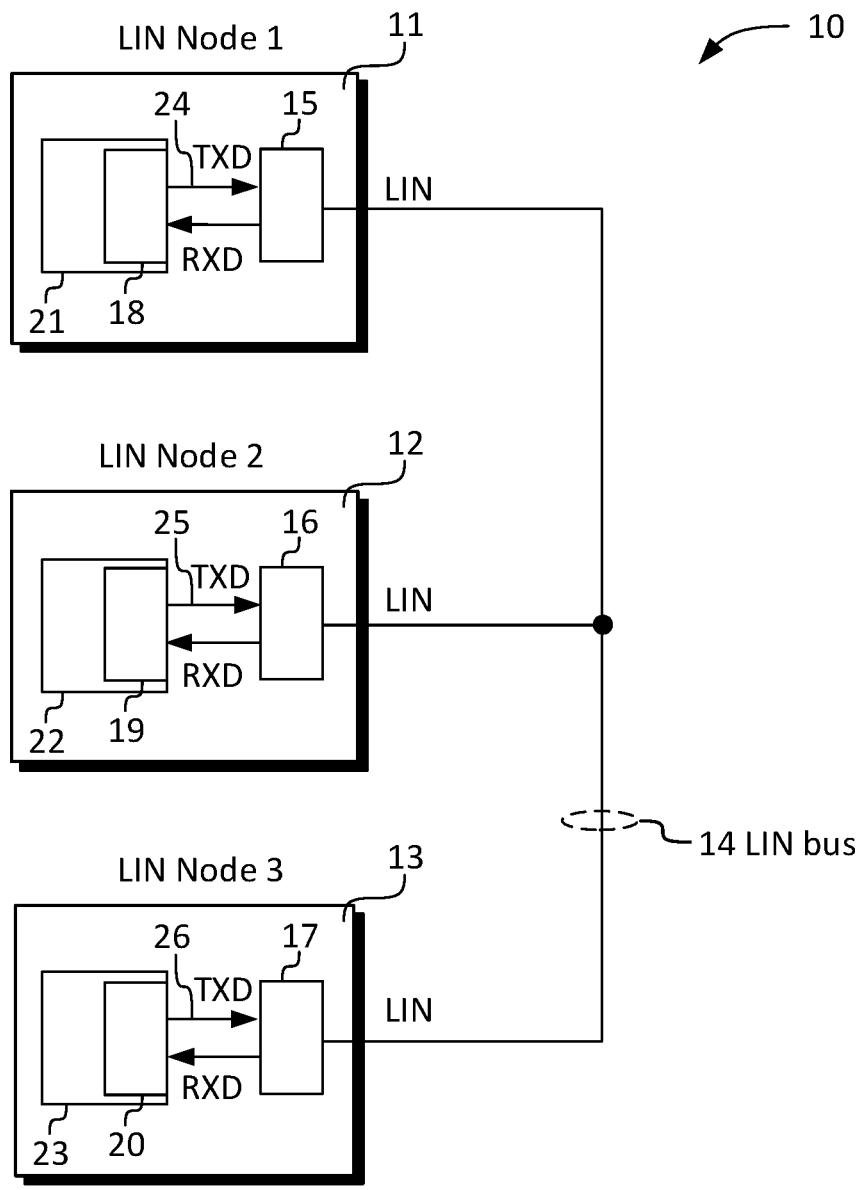
FIG. 1 illustrates a prior art LIN bus interconnecting three LIN nodes.

FIG. 1 illustrates three LIN nodes 11, 12, 13 being connected to a LIN bus 14. A LIN bus is a master-slave serial communication bus. All LIN nodes (embodied in the form of e.g. ECUs) in a LIN network 10 are connected to the LIN bus. Normally one of the LIN nodes is a LIN master and the remaining LIN nodes are LIN slaves.

Internally, each LIN node 11, 12, 13 has a bus interface circuit; a LIN transceiver 15, 16, 17. Each LIN node also has a LIN protocol controller 18, 19, 20 which handles protocol bit stream reception and transmission on data link layer according to ISO 17897. A microcontroller 21, 22, 23 is connected to the respective LIN protocol controller (or frame processor) 18, 19, 20. The LIN controllers may optionally be a part of the microcontrollers.

The LIN protocol uses a serial bit stream with values 0 and 1, or also known as dominant and recessive bits that make up LIN frames and other protocol symbols transmitted on the LIN bus 14. All LIN nodes 11, 12, 13 are capable of transmitting frame responses to a frame header. The LIN protocol controller 18, 19, 20 is handling the reception and transmission of LIN frames. The transmitted bit values 0 and 1 from the LIN protocol controller are converted in the LIN transceiver 15, 16, 17 in each LIN node into two voltage levels on the LIN bus 14, which is referred to as recessive and dominant state. That is, the recessive state is caused by recessive data being sent over the bus, while the dominant state is caused by dominant data being sent over the bus. These states relate to two voltage ranges on the LIN bus 14. For reception it is the reverse; the LIN transceiver 15, 16, 17 converts the two voltage levels on the LIN bus 14 into suitable levels to the LIN protocol controller 18, 19, 20.

Each LIN node 11, 12, 13 can drive the LIN bus 14 into a series of recessive/dominant states, enabling a communication network according to ISO 17897. The LIN protocol data link layer defines how sharing of the network is performed, according to a time-division multiple access (TDMA) operation driven by a LIN master.

A LIN database is used, among other things, for associating LIN frame identifiers to each LIN node. It can be used as a base for implementation of the frame transmission and reception in each LIN node, as well as being used for analysis of the communication or runtime operation of the LIN nodes by connecting an optional LIN analysis tool. The LIN database may be seen as a lookup table; the identifier is input and the LIN node name is obtained as a result. A LIN identifier has a unique characteristic in that it points to a certain LIN node as being the transmitter of a frame response for a certain frame. Further, the LIN database normally implies that any given identifier is only associated to one LIN node as being the transmitter of a frame response.

In this disclosure the terms event, LIN event, and protocol event should be interpreted broadly. That is; as an occurrence of a LIN protocol procedure or mechanism defined in LIN datalink layer protocol ISO 17987-3 or physical layer 17987-4. Examples are frame header transmission, frame response transmission or network start up/wakeup. Additional examples of events are procedures that are not defined in LIN data link layer protocol 17987-3, and can constitute for instance misbehaviour or misuse of the LIN protocol, as well as misbehaviour preventing shutdown of the LIN network, or wakeup the LIN network.

Figure 2:
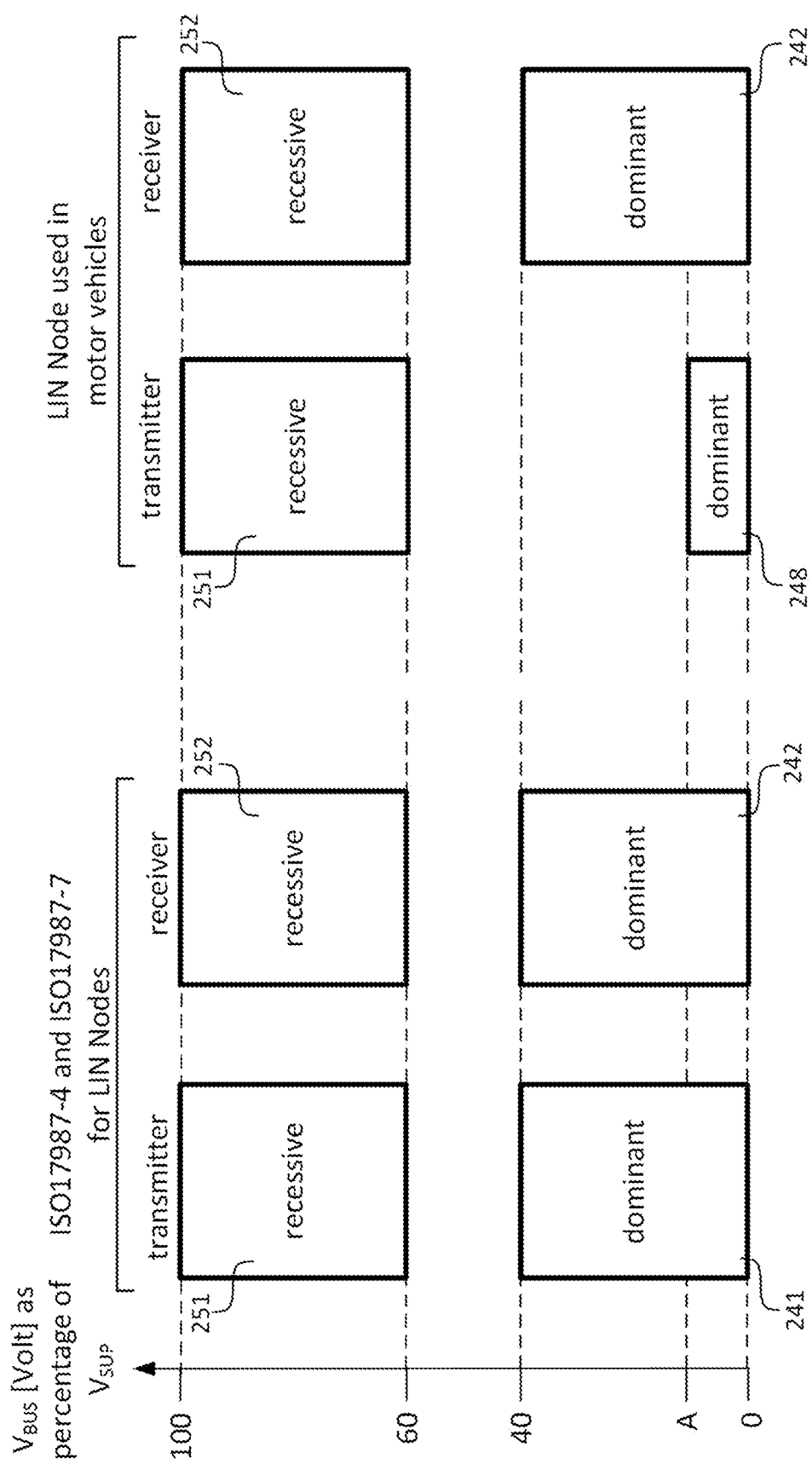
FIG. 2 illustrates stipulated voltage ranges on the LIN bus for recessive and dominant data transferred over the bus, according to standard ISO 17987-4 and according to actual implementations used in motor vehicles.

FIG. 2 illustrates on a left-hand side stipulated voltage ranges on the LIN bus for recessive and dominant data transferred over the bus, according to standards ISO 17987-4- and 17987-7. The voltage ranges defined by ISO 17987-4 result in no margins around the 40% and 60% levels, between transmitter voltages and receiver voltages, and may in some examples not be preferred. In practice, a slightly modified voltage range as shown on a right-hand side is typically utilized.

The LIN bus interconnection of LIN nodes corresponds to a "wired-AND" mechanism. Recessive bits (logic 1) are overwritten by dominant bits (logic 0). In recessive state, a dominant bit from any one or more LIN nodes result in a dominant bus state. As long as no LIN node is sending a dominant bit, the bus is in the recessive state.

In FIG. 2 details are shown for expected LIN bus voltage (called $V_{BUS}$) values measured between the LIN bus 14 and ground, for transmitter part of a LIN transceiver (bus driver) and receiver part of a LIN transceiver (bus line receiver/comparator). The transmitter allowed voltage is in intervals 251 and 241 for recessive and dominant state while the receiver must accept intervals 252 and 242 as recessive and dominant state respectively. The voltage of $V_{BUS}$ is given as a percentage of the supply voltage $V_{SUP}$ of the LIN nodes. The supply voltage $V_{SUP}$ may vary for different systems, vehicles and operational modes of a vehicle. The voltage $V_{BUS}$ in dominant state must be between 0 and 40% of the supply voltage $V_{SUP}$ of the LIN nodes on the transmitting LIN node output as well as on the receiving LIN node input. For a given LIN node, the actual dominant data voltage falls anywhere within this range but is more or less fixed, with slight variation over temperature and loading from bus termination components and impedance of the LIN cable.

For a population of ECUs (i.e. LIN nodes) in a single vehicle or a fleet of vehicles, the $V_{BUS}$ dominant voltage may vary from ECU to ECU within the range between 0 and 40% of the supply voltage $V_{SUP}$. The variation is due to several reasons like transceiver hardware production tolerances, different transceiver brands, temperature, ageing, shifts in ground reference levels, and so on. These many reasons are partly why the allowed range from 0 to A % of voltage $V_{SUP}$ exists, to give a robust and tolerant system even with large differences in voltage levels on the same LIN network.

A receiving ECU being compliant with ISO 17897-4- and 17897-7 must accept a voltage $V_{BUS}$ from 0 to 40% of $V_{SUP}$ as dominant. For recessive state, $V_{BUS}$ is in the range from 60% to 100% of $V_{SUP}$. For receiver voltages between 40% and 60% of $V_{SUP}$ the resulting state is undefined but normally there is a recessive-to-dominant and dominant-to-recessive state transition with hysteresis implemented. As can be seen on the right-hand side, dominant transmit is in practice commonly selected to be from 0 to A % of $V_{SUP}$, i.e. within the range denoted 248, where the value A is appropriately selected depending on the application and may in some examples be around 5-15% of $V_{BUS}$.

Again with reference to FIG. 1, the case when two or more LIN nodes transmit dominant state at the same time is an unexpected situation, as a frame header is normally transmitted by a LIN master, and a frame response is normally only transmitted by any one of the LIN master or LIN slaves. When more than one LIN node is transmitting a dominant state at the same time it cannot always be determined for each LIN node respectively, whether it is transmitting dominant data or recessive data thereby causing a dominant state and a recessive state on the bus, respectively, by analysing bus voltage $V_{BUS}$, since all LIN nodes are directly connected to each other via the LIN bus. Determining this is even more difficult if the dominant state output voltage from each LIN node is very close to each other so that they can not be reliably distinguished. This is not a problem in LIN communication for the ECUs but adds difficulty to advanced network analysis.

However, if it is required to analyse whether for instance the first LIN node 11 or the second LIN node 12 or both is actually driving the LIN bus into dominant state, this cannot be determined in a reliable way by measuring the voltage on the LIN bus. It gets more difficult to achieve a method working for all LIN buses in all vehicles including all variables such as transceiver brand, age, temperature and so on, since dominant state output voltage is allowed to vary within a relatively large range (from 0 to 40% of $V_{SUP}$) and most likely there will be a distribution of voltages where a few ECUs have less $V_{BUS}$ dominant drive capability than others ECUs on the same LIN bus.

Further, by analysing the current that each LIN node drive into the LIN bus while at the same bit time transmitting dominant data is also a challenge since in principal it is only the LIN node with the highest $V_{BUS}$ dominant drive capability that force current. Alternatively it is only the LIN nodes with highest $V_{BUS}$ dominant drive capability that actually force a reliably measureable current to flow out of the transceiver.

If it is required to analyse whether for instance the first LIN node 11 or the second LIN node 12 or both is actually driving the LIN bus into dominant state, this cannot be determined in a reliable way by measuring the current flow to/from the transceiver 15, 16 and the LIN bus.

Figure 3:
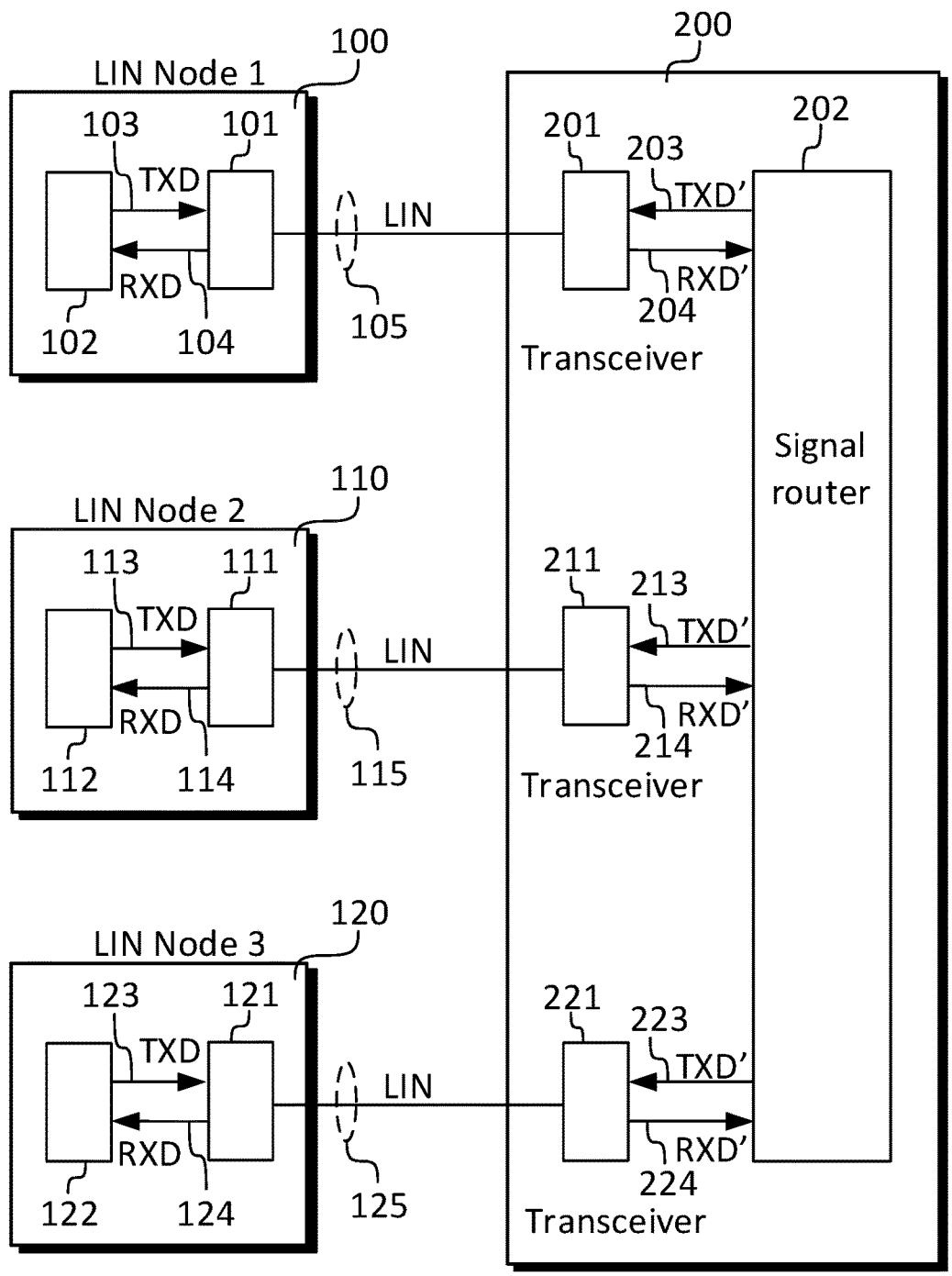
FIG. 3 illustrates a monitoring device 200 according to an embodiment being configured to monitor a plurality of LIN buses.

FIG. 3 illustrates a monitoring device 200 according to an embodiment being configured to monitor LIN nodes 100, 110, 120 being connected to LIN buses 105, 115, 125 connected between the monitoring device 200 and the respective LIN node 100, 110, 120.

At least two LIN buses are connected to the monitoring device 200, where at least one LIN node is connected to each LIN bus. However, a greater number of LIN nodes may be connected to each LIN bus. Further, the monitoring device 200 is configured to transfer signals carried over any one of the LIN buses to the remaining LIN buses. Thus, signals transferred over the first LIN bus 105 is carried over the second LIN bus 115 and the third LIN bus 125, signals transferred over the second LIN bus 115 is carried over the first LIN bus 105 and the third LIN bus 125, and so on.

It is noted that a number of LIN nodes may be connected to a bus. If a certain LIN node is to be monitored, then that LIN node should be the only node connected to a bus. However, it may be envisaged that a group of LIN nodes is to be monitored in a scenario where it is not necessary to distinguish between individual LIN nodes in the group. For instance, it may be desirable to analyse a group of LIN nodes originating from the same manufacturer. If so, the group of LIN nodes can all be connected to the same LIN bus.

As in FIG. 1, the LIN nodes 100, 110, 120 comprise a LIN transceiver 101, 111, 121, a LIN protocol controller 102, 112, 122 and a microcontroller (not shown in FIG. 3). As is understood, a LIN transceiver and a LIN protocol controller is required for any device configured to be connected to a LIN bus. In this example, as in FIG. 1, a LIN controller is part of a micro-controller. In another example, the LIN controller is not part of a micro-controller but is a separate part in a LIN node.

The monitoring device 200 according to an embodiment comprises a LIN transceiver 201, 211, 221 connecting to the respective LIN bus 105, 115, 125.

Further, the monitoring device 200 comprises a signal router 202 configured to route the LIN signals transmitted over any LIN bus to the remaining LIN buses. For instance, any LIN signal transmitted by first LIN node 100 is received by the first LIN transceiver 201 and then routed via the signal router 202 to the second LIN transceiver 211 and the second LIN node 110 as well as to the third LIN transceiver 221 and the third LIN node 120. While the monitoring device 200 is illustrated as a hardware device in FIG. 3, it may also be envisaged that the device can be implemented as a simulation model for simulating behaviour of LIN nodes in the form of e.g. ECUs.

The routing of signals by the signal router 202 is performed since the LIN nodes 100, 110, 120 under test should display the same behaviour as if they were connected to a single LIN bus as shown in FIG. 1. In other words, all of the LIN buses 105, 115, 125 should be exposed to the same data.

Hence, assuming that a "real-world" scenario is to be tested using the setup of FIG. 3. One or more of the LIN nodes 100, 110, 120 may be triggered to perform a selected action resulting in signals occurring on the LIN buses, i.e.

LIN data being sent from one of the LIN nodes 100 via the bus 105 to the monitoring device 200 is routed to the remaining LIN nodes 110, 120 over the respective bus 115, 125.

Figure 4:
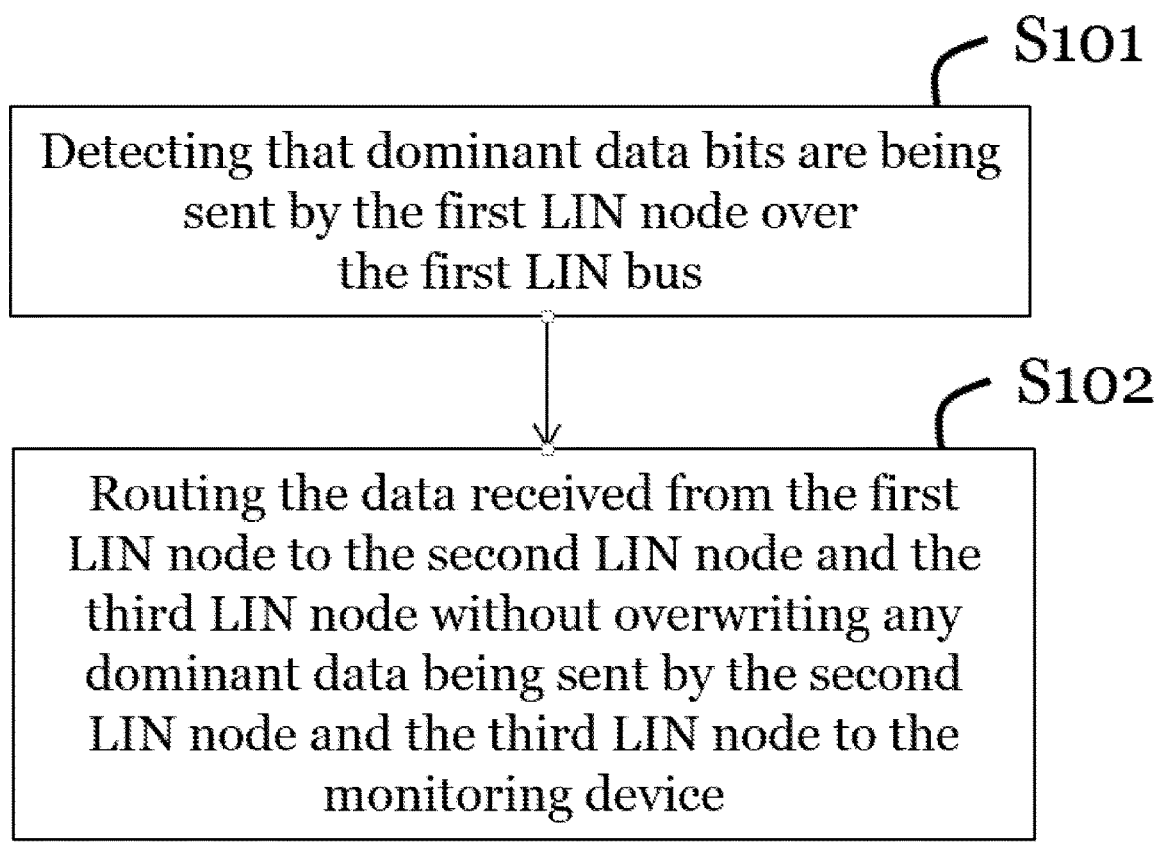
FIG. 4 shows a flowchart illustrating a method of the monitoring device of monitoring a plurality of LIN buses according to an embodiment.

Reference will further be made to FIG. 4 showing a flowchart illustrating a method of the monitoring device 200 of monitoring the plurality of LIN buses 105, 115, 125 according to an embodiment.

Hence, the monitoring device 200 monitors, for each of the LIN nodes 100, 110, 120, any event occurring on the LIN buses 105, 115, 125. That is, any data sent via the LIN bus of each LIN node is monitored by the monitoring device 200. In this particular example, it is assumed that the first LIN node 100 sends data over the first LIN bus 105 to the first LIN transceiver 201 of the monitoring device 200.

In order to re-create the situation where all the LIN nodes 100, 110, 120 are connected the LIN bus as previously has been illustrated with reference to FIG. 1, the monitoring device 200 receives the LIN data via the first LIN transceiver 201, performs a detection process in step S101 (to be described in detail below) and routes in step S102 the LIN data via signal RXD' over path 204 to the signal router 202 and further on via a) signal TXD' over path 213 to the second LIN transceiver 211 over the second LIN bus 115 to the second LIN node 110, and b) signal TXD' over path 223 to the third LIN transceiver 221 over the third LIN bus 125 to the third LIN node 120.

Advantageously, the LIN nodes 100, 110, 120 are analysed in a non-intrusive manner. The LIN nodes 100, 110, 120 are no longer electrically directly connected to each other on a physical layer, but remains connected on a datalink layer. It is to be noted that for any new vehicle, the monitoring device 200 may be implemented from scratch in the manner illustrated in FIG. 3, while for an existing vehicle implementing the prior art LIN bus of FIG. 1, the bus would have to be "broken up" such that the monitoring device 200 can be connected as shown in FIG. 3.

Thus, datalink timing between the LIN nodes remains unaffected and the LIN nodes share all transmitted recessive and dominant bits exactly as if the LIN nodes were still directly connected to each other via a single LIN bus. This is applicable for all possible events, including events that are outside the defined events in the LIN protocol.

Hence, with the routing of data over the remaining LIN buses 115, 125 to the remaining LIN nodes 110, 120, the monitoring device 200 does not affect the LIN network in a manner such that the behaviour of the LIN nodes changes; the LIN nodes 100, 110, 120 will act as if they are connected to a single LIN bus.

However, while the monitoring device 200 receives data over the RXD' wire 204 from the first LIN node 100, the event detection device 200 may simultaneously send data, for instance originating from the second LIN node 110, to the first LIN node 100 via TXD' wire 203.

This implies that each LIN bus 105, 115, 125 may be driven dominant by both the LIN nodes (in this example the first LIN node 100) and also by the monitoring device 200 at the same time, since the monitoring device 200 routes data received over any one of the LIN buses to the remaining LIN buses. Driving a LIN bus dominant from the LIN node side and from the monitoring device side suggests a potential problem, in that the monitoring device 200 cannot determine why the LIN bus 105 is dominant. That is, whether it is because the first LIN data 100 is transmitting dominant data bits or because the monitoring device 200 itself is transmitting dominant data bits.

If not resolving this critical problem, the monitoring device 200 may latch up and never release the dominant state to which it has driven the LIN bus 105. The latch up problem would occur as soon as at least two LIN nodes out of LIN nodes 100, 110, 120 transmit dominant data bits, thereby causing a dominant state, at the same time.

Thus, in step S101, the monitoring device 200 detects if any dominant data bits are being sent by any LIN node, 100, 110, 120 over the respective LIN bus 105, 115, 125. In this particular example, the monitoring device 200 detects that dominant data is being sent over the first LIN bus 105 by the first LIN node 100.

Further, if the first LIN node 100 is the one sending the dominant data bits, these dominant bits are routed in step S102 to the second LIN node 110 and the third LIN node 120, in a manner such that the routed dominant bits do not overwrite any dominant bits transferred by the second LIN node 110 and the third LIN node 120 over the LIN buses 115, 125.

Advantageously, any dominant data received by the monitoring device 200 over any LIN bus 105, 115, 125 is routed to the LIN nodes 100, 110, 120 connected to the remaining LIN buses 105, 115, 125.

As an example, dominant data received from the first LIN node 100 over the first LIN bus 105 is routed to the second LIN node 110 over the second LIN bus 115 and to the third LIN node 120 over the third LIN bus 125.

Further, any dominant data simultaneously received by the monitoring device 200 for instance from the second LIN node 110 over the second LIN bus 115 is routed to the first LIN node 100 over the first LIN bus 105 and to the third LIN node 120 over the third LIN bus 125, in a manner such that the dominant data received from the first LIN node 100 to not overwrite the dominant data received from the second LIN node 110, and vice versa.

Hence, the above described latch up problem is advantageously overcome.

Figure 5:
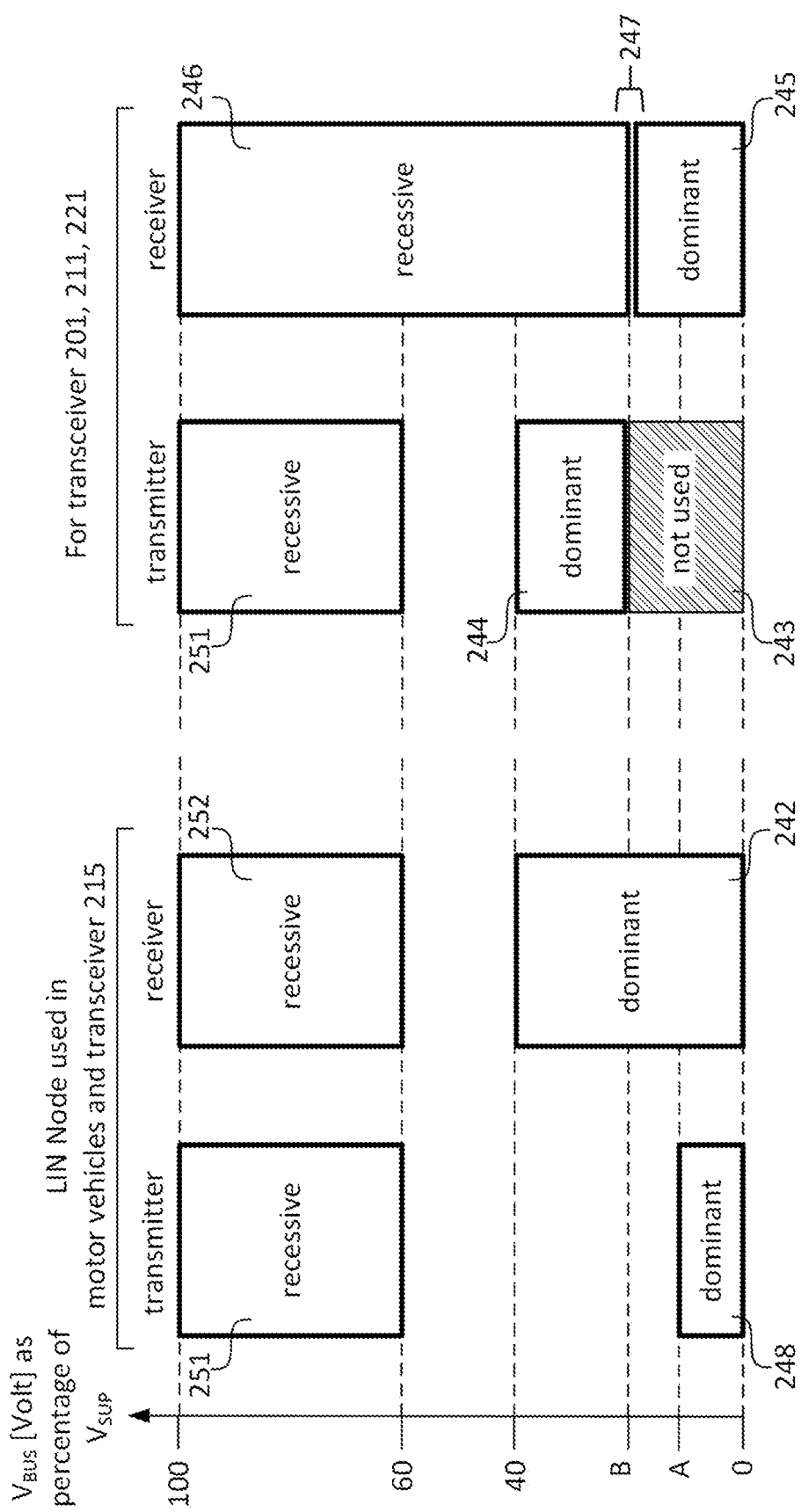
FIG. 5 illustrates on a right-hand side stipulated voltage ranges on the LIN buses for recessive and dominant data of the monitoring device according to an embodiment.

With reference to FIG. 5, in an embodiment, the dominant data bit detection is performed as will be described in the following. In FIG. 5, the voltage diagram on the left-hand side is identical to that previously illustrated on the right-hand side in FIG. 2. Hence, the LIN nodes 100, 110, 120 are all configured to output data where a voltage $V_{BUS}$ between the LIN bus 14 and ground potential is in a range from 0 to A % of $V_{SUP}$, where A is a value lower than 40% of $V_{SUP}$.

However, the voltage diagram on the right-hand side illustrates voltage levels which the monitoring device 200 is configured to comply with according to an embodiment. In the voltage diagram on the right-hand side, it is illustrated that the monitoring device 200 is configured to output dominant data bits to the LIN nodes at a voltage level not exceeding a maximum receive voltage level stipulated by the LIN standard for dominant data bits, i.e. not exceeding 40% of $V_{SUP}$, but not overlapping with the voltage level with which the LIN nodes are configured to output dominant data bits, i.e. at least B % of $V_{SUP}$. That is, the dominant data bits are outputted by the monitoring device 200 at a voltage level falling into range 244, where the range 244 does not overlap with the range 248. However, the range 244 is configured to overlap with range 242, such that the LIN nodes will perceive a voltage in range 244 as dominant data being sent by the monitoring device 200.

Further, the monitoring device 200 is configured to receive dominant data at a voltage level at least being in the range 248 with which the LIN nodes 100, 110, 120 are configured to output dominant data, i.e. in the range from 0 to A % of $V_{SUP}$, even though dominant receive range of the monitoring device 200 may be configured to be in range 245, i.e. from 0 to just below B % of $V_{SUP}$. For the monitoring device 200, the dominant transmit range 244 should not overlap with the dominant receive range 245, since that would cause a latch-up on the LIN bus.

To comply with recessive receive stipulated in ISO 17879-4 and 17897-7, range 246 should at least overlap with range 251, but preferably also with range 252 (but not with range 248), even though the range 246 could extend over the voltage span illustrated in FIG. 5. Further, the monitoring device 200 should interpret its own dominant transmit data voltage range 244 as recessive receive, implying that range 246 overlaps with range 244. The boundary range between ranges 245 and 246 is denoted 247.

As a result, the monitoring device 200 will advantageously detect a dominate state driven by any of the LIN nodes 100, 110, 120 in case the voltage on the buses 105, 115, 125 is from 0 to A % of $V_{SUP}$, since range 248 overlaps with range 245, while the monitoring device 200 uses a voltage in the range 244 (which does not overlap with the range 248) to transmit dominant bits, i.e. to cause a dominant state on the LIN bus 14. That is, the LIN nodes 100, 110, 120 output dominant data at a voltage level between 0 and A % of $V_{SUP}$ while the monitoring device 200 outputs dominant data at a voltage level between B and 40% of $V_{SUP}$, where B should exceed A.

In one embodiment there is an advantage of having the voltage A % and B % clearly separated. Such separation accomplishes a margin between transmitted dominant voltage 248 and received dominant voltage 245, which adds robustness to the system.

The receiver dominant detection voltage range of the monitoring device 200 (defined by voltage interval 245) is configured not to overlap its transmitter dominant voltage interval 244. Further, the $V_{BUS}$ voltage where transition recessive-to-dominant and transition dominant-to-recessive occur and is provided by transceiver 201, 211, 221 output signals RXD, lies between voltage intervals 245 and 246 (i.e. the boundary range 247).

Figure 6:
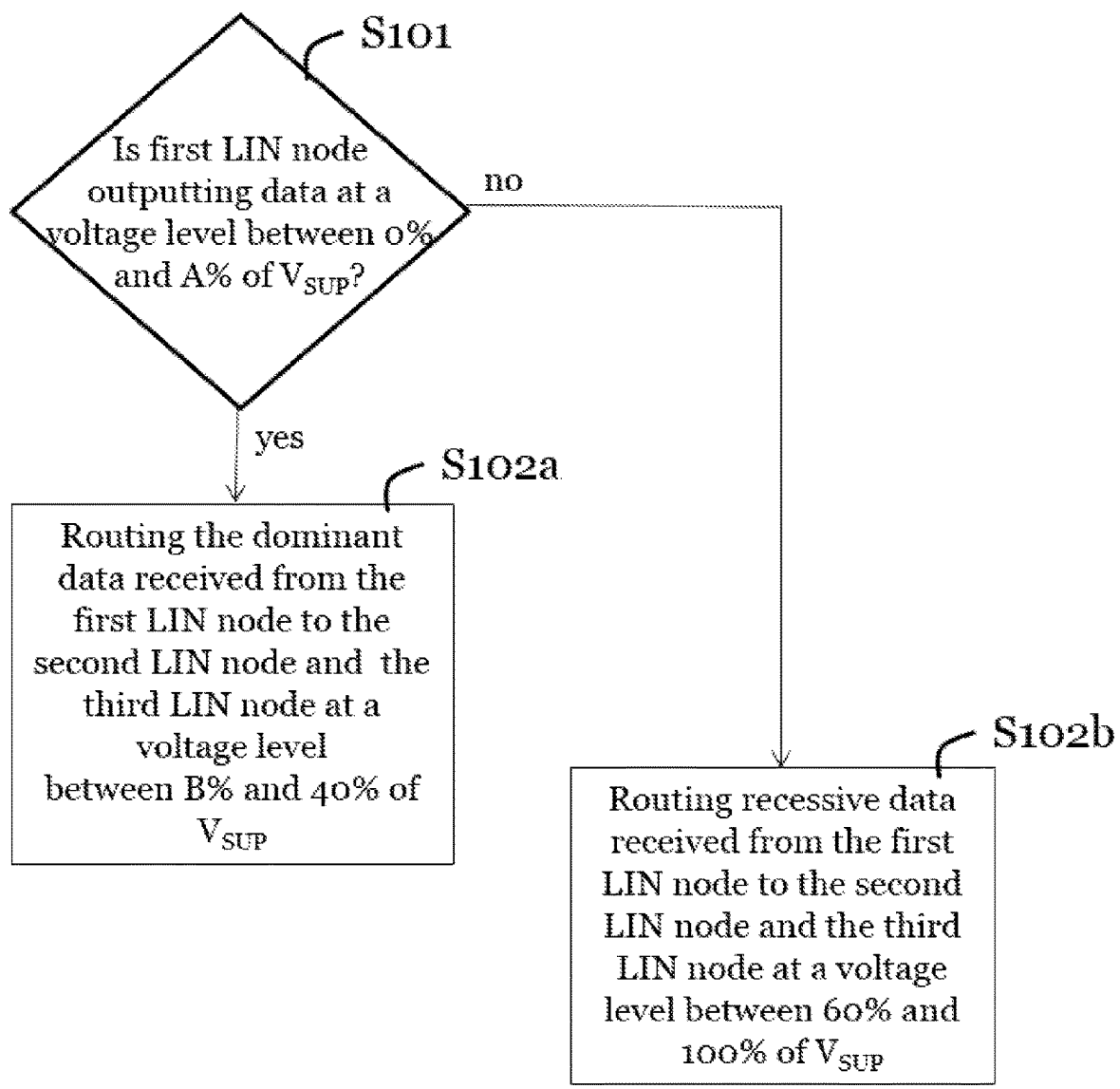
FIG. 6 shows a flowchart illustrating a method of the monitoring device of monitoring the plurality of LIN buses according to an embodiment.

Reference will further be made to FIG. 6 showing a flowchart illustrating a method of the monitoring device 200 of monitoring the plurality of LIN buses 105, 115, 125 according to the embodiment discussed with reference to FIG. 5.

As can be seen, if the monitoring device 200 detects that the voltage of the data sent over the first LIN bus 105 from the first LIN node 100 is in the range from 0 to A % of $V_{SUP}$ in step S101, the correspondingly dominant data received from the first LIN node 100 is routed to the second LIN node 110 and the third LIN node 120 over the second and third LIN bus 115, 125 at a voltage level between B % and 40% of $V_{SUP}$, where B>A in step S102a. Advantageously, this avoids overwriting any dominant data simultaneously being written to the second LIN bus 115 by the second LIN node 110 and/or to the third LIN bus 125 by the third LIN node 120, since the outputted LIN node dominant data always is at a lower voltage level than the outputted monitoring device dominant data, i.e. there is no overlap between ranges 244 and 248.

According to ISO 17987-4, the LIN transceiver for a LIN master and LIN slave is internally arranged with a pull-up resistor which will passively pull-up the bus voltage $V_{SUP}$ to be well above 60%, when all LIN nodes are driving at a recessive state. A LIN node driving dominant state will actively by means of e.g. a transistor actively drive the voltage to a lower voltage level. The LIN node that have the capability to actively drive, or pull down, the bus voltage to the lowest voltage $V_{SUP}$ will be the LIN node determining the resulting bus voltage $V_{SUP}$.

In another scenario, if the data over the first LIN bus 105 is not in the range from 0 to A % of $V_{SUP}$ in step S101—and the monitoring device 200 is not sending dominant data over the first LIN bus 105, thereby indicating that dominant data is not being sent by the second LIN node 110 and/or by the third LIN node 120—recessive data is received from the first LIN node 100, which is routed in step S102b from the first LIN node to the second LIN node and the third LIN node at a voltage level between 60% and 100% of $V_{SUP}$. It should be noted that if any one of the other LIN nodes 110, 120, for instance the second LIN node 110, would transmit dominant data, that particular dominant data would be routed to the first LIN node 100 and the third LIN node 120, and any recessive data from the first LIN node 100 would thus be overwritten.

Figure 7:
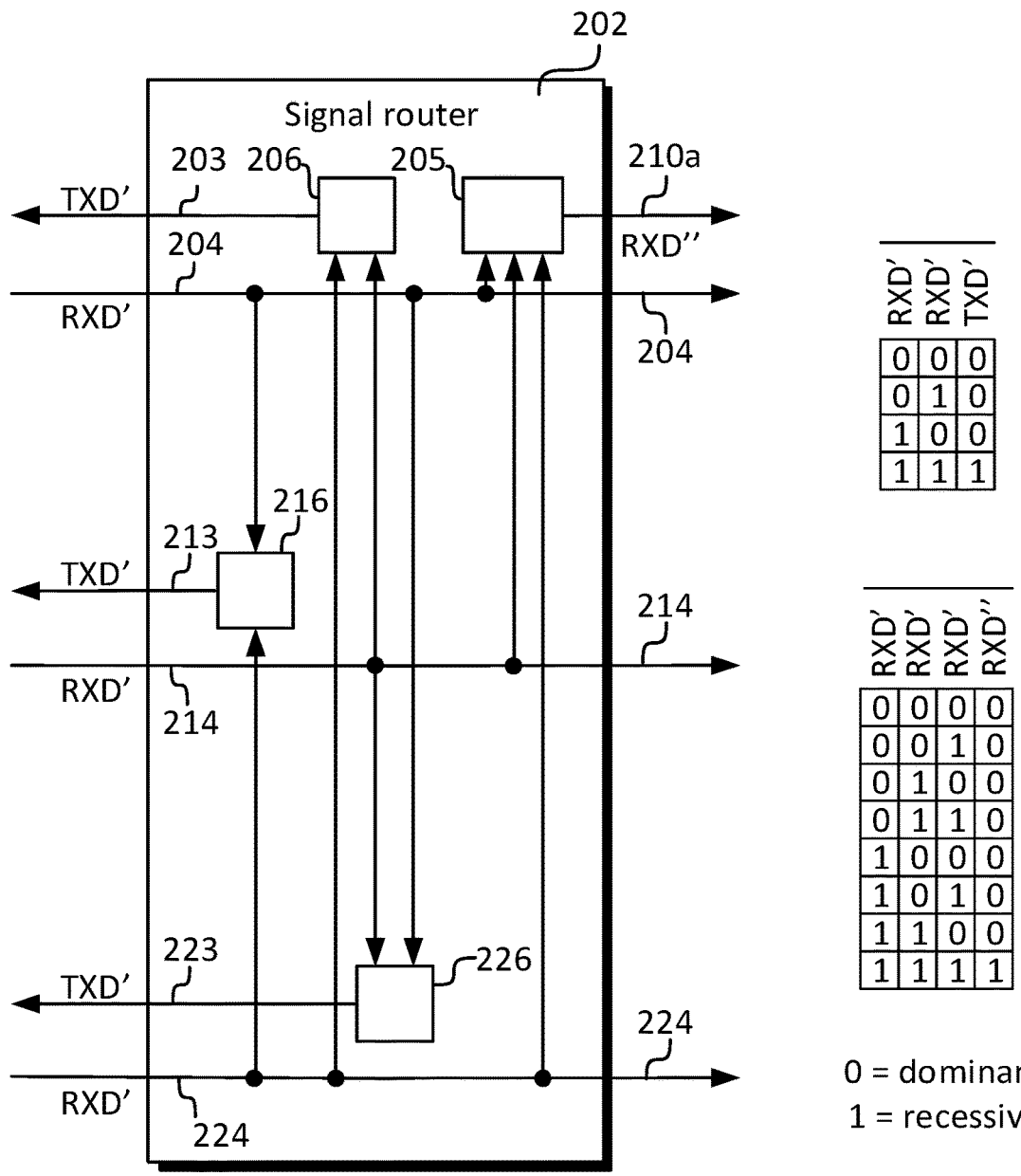
FIG. 7 illustrates an embodiment where a signal router of the monitoring device encodes data received from the respective LIN node.

FIG. 7 illustrates a further embodiment, where the signal router 202 of the monitoring device 200 encodes data received from the respective LIN node.

Hence, data received from the first LIN node 100 via the first LIN transceiver 201 with signal RXD' over path 204 is combined in a first encoder 216 with data received from the third LIN node via the third LIN transceiver 221 with signal RXD' over path 224. As can be seen in the upper table, if any combined bits of the received data is 0, then the output of the first encoder is 0. As a consequence, the signal router 202 will output dominant data, i.e. a 0, indicating a dominant state with the signal TXD' over path 213, which 0 the second LIN transceiver 211 converts to a voltage in the range from B % to 40% of $V_{SUP}$ and outputs to the second LIN node 110 as soon as any one or both of the first LIN node 100 and the third LIN node 120 outputs dominant bits (i.e. a 0 represented by a voltage in the range B % to 40% of $V_{SUP}$).

Correspondingly, a second encoder 206 receives data from the second LIN node 110 and the third LIN node 120 and outputs a 0 to the first LIN node 100 if any one or both of the second LIN node 110 and the third LIN node 120 transmits a 0, i.e. a dominant bit, while a third encoder 226 receives data from the first LIN node 100 and the second LIN node 110 and outputs a 0 to the third LIN node 120 if any one or both of the first LIN node 100 and the second LIN node 110 transmits a 0.

As can be concluded, if data received from any one of the LIN nodes over the LIN buses indicates a dominant state in the form of a 0 represented by a voltage in the range from 0 to A % of $V_{SUP}$, the encoders will output a dominant bit in the form of a 0, which the associated LIN transceivers transmits to the remaining LIN nodes in the form of a voltage in the range from B % to 40% of $V_{SUP}$.

As further can be seen in FIG. 7 (and also in FIG. 3), the monitoring device 200 monitors any data transmitted by the LIN nodes 100, 110, 120 via the respective signal RXD' over paths 204, 214, 224.

In a further embodiment, also described with reference to FIG. 7, the signal router 202 comprises a fourth encoder 205, where data received from the first LIN node 100 via the first LIN transceiver 201 with the signal RXD' over path 204 is combined with data received from the second LIN node 110 via the second LIN transceiver 211 with the signal RXD' over path 214 and with data received from the third LIN node 120 via the third LIN transceiver 221 with the signal RXD' over path 224. Again, as can be seen in the lower table, if data received from any one of the LIN nodes indicates a dominant state in the form of a 0 represented by a voltage in the range from 0 to A % of $V_{SUP}$, the fourth encoder will output a dominant bit in the form of a 0 over wire 210a. The signal RXD" sent over path 210a is routed to a LIN protocol handling device 230, as will be discussed in the following.

Figure 8A:
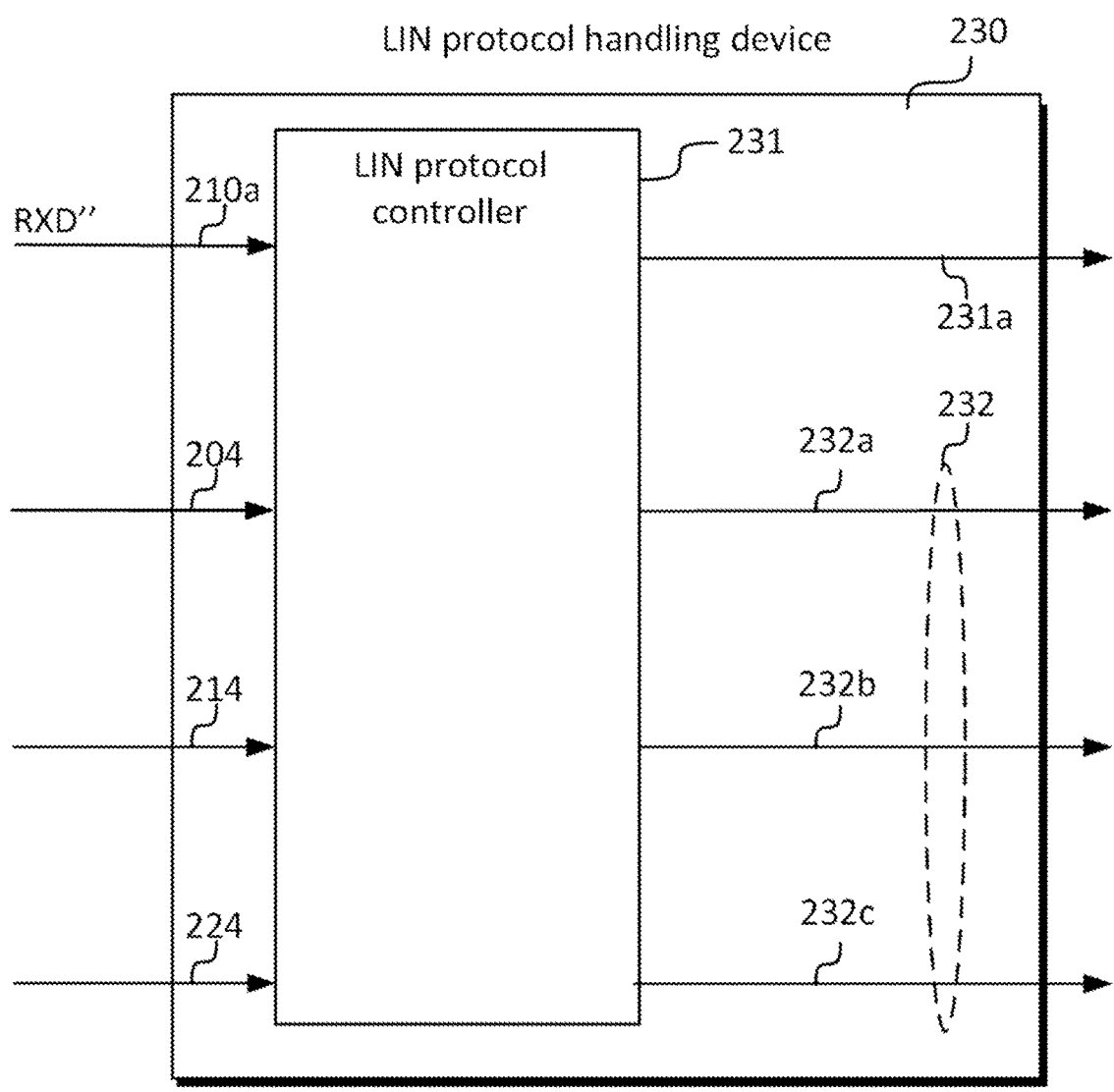
FIG. 8a illustrates a LIN protocol handling device of the monitoring device according to an embodiment.

FIG. 8a illustrates the LIN protocol handling device 230 according to an embodiment, which functionally comprises a LIN protocol controller 231, or frame processor, which LIN protocol handling device 230 utilizes the signal RXD" carried over path 210a.

Figure 8B:
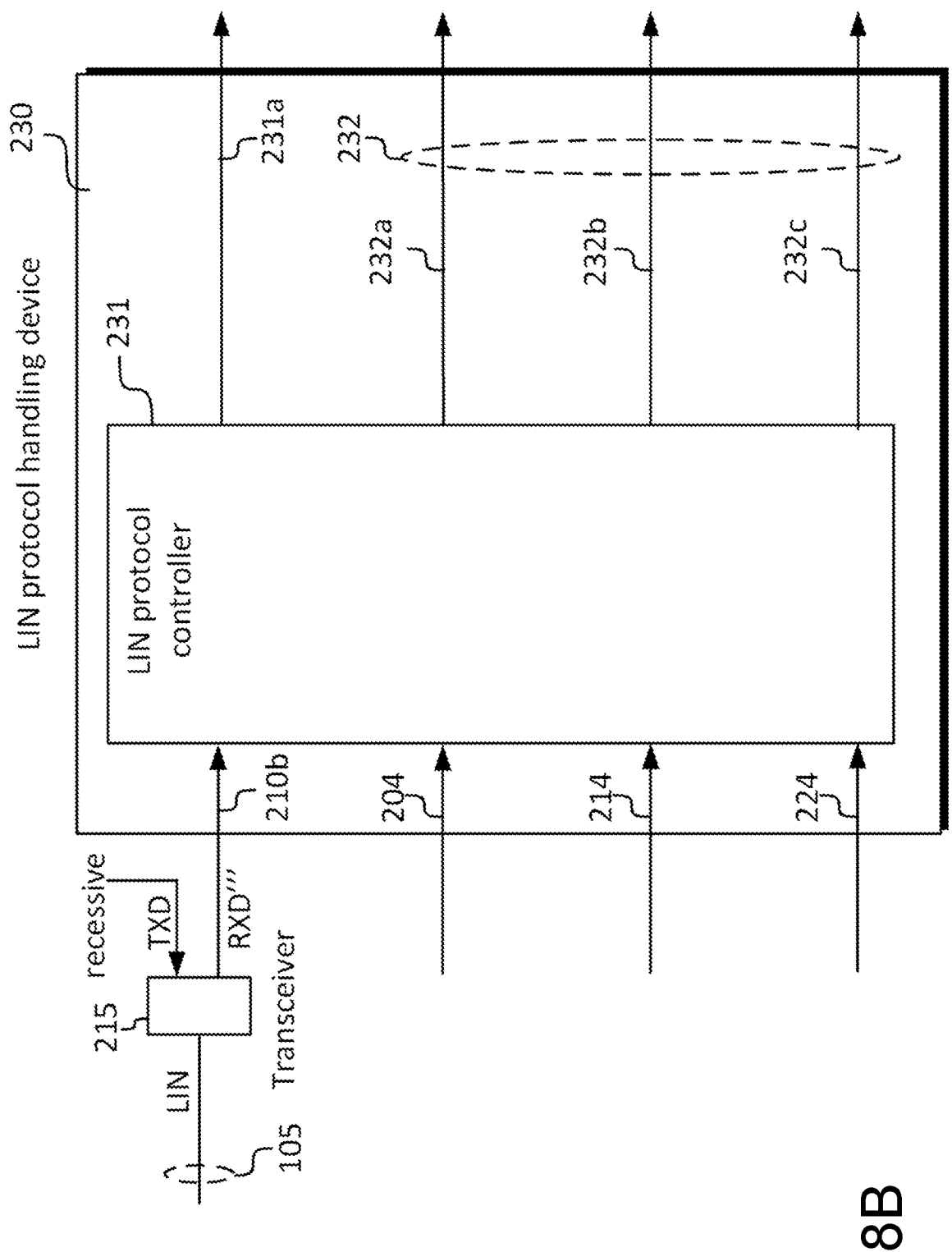
FIG. 8b illustrates a LIN protocol handling device of the monitoring device according to another embodiment.

FIG. 8b shows the LIN protocol handling device 230 utilizing an alternative signal RXD''' carried over path 210b according to an embodiment.

Path 210b serves the same purpose as the signal path 210a; to provide a combined signal where data being carried over the LIN buses 105, 115, 125 is routed to the LIN protocol handling device 230. Since the monitoring device 200 routes data from the second LIN bus 115 and the third LIN bus 125 to the first LIN bus 105, the data on the first LIN bus 105 (or that on any bus) represent combined data from the first, second and third LIN nodes 100, 110, 120. A transceiver 215 is connected to LIN bus 105 and the RXD wire 210b. The transceiver 215 has the same voltage ranges for reception as the LIN Nodes 100,110,120, which are according to ISO 17987.

In one example the transceiver 215 only uses its receiver part while the transmitter part is not used and therefore the transmitter input TXD signal is permanently tied to a recessive state. In another example the transceiver 215 is instead a bus line receiver and there is no transmitter or TXD signal provided.

With reference to FIGS. 8a and 8b, the signal 210b or alternatively the signal 210a output from the fourth encoder 205 (discussed with reference to FIG. 7) which combines signals from all the LIN nodes 100, 110, 120 is supplied to the LIN protocol controller 231. The LIN protocol controller 231 monitors all events from each LIN node as one composite signal 210a (or 210b), which signal 210a (or 210b) represents what each LIN node 100, 110, 120 actually is seeing on the respective LIN bus 105, 115, 125 (corresponding to the data being transferred over the LIN bus 14 of FIG. 1), in this particular example the data sent by the first LIN node 100 as previously discussed. Further, the LIN protocol controller 231 is capable of interpreting the data received with signal 210a or 210b in the context of a LIN frame. Thus, the LIN protocol controller 231 maps the data received with signal 210a or 210b into a LIN frame (or a plurality of LIN frames). The LIN protocol controller 231 has no TXD path back to any of the transceivers 201, 211, 221 or 215, or encoder 205. This is intentional since it must not affect the data that it shall monitor.

In one embodiment the transceivers 201, 211, 221 does not support being set to standby mode and continuously pass all symbols like frames headers, frame response and wakeup signals and any dominant state not recognized as a valid LIN protocol symbol to LIN protocol controller 231. The LIN protocol controller 231 is configured to recognize wakeup signals according to ISO 17987-3.

Further, any one of LIN nodes 100, 110, 120, can be a LIN master, and the remaining LIN nodes can be LIN slaves. The monitoring device 200 advantageously handles the LIN master being connected to any of the LIN buses 105,115, 125. If more than one LIN master would be connected, e.g. the first LIN node 100 being a LIN master and the second LIN node 110 also being a LIN master, this unusual system configuration could be identified by the LIN monitoring device 200.

The LIN protocol controller 231 is in an embodiment capable of encoding the data received over paths 210a or 210b into LIN frame headers and LIN frame responses as specified in the LIN standard. Examples of such LIN frames will be given hereinbelow. These LIN frames may be provided for display to an operator of the monitoring device 200 via path 231a.

Further, the LIN protocol controller 231 is in an embodiment capable of mapping events indicated by the LIN protocol controller to specific LIN nodes, and providing this information via paths 232a, 232b, 232c such as for instance "LIN frame header received from the first LIN node" via path 232a, "LIN frame response received from the second LIN node" via path 232b, etc. Any LIN frame format may be used.

Included are also the TXD signals 103, 113, 123 from the LIN nodes 100, 110, 120. Those TXD signals are not available to the monitoring device 200. However, their waveforms are recreated by the transceivers 201, 211, 221 in the monitoring device 200 as signals 204, 214, 224 and are shown for illustrational purposes.

Figure 9:
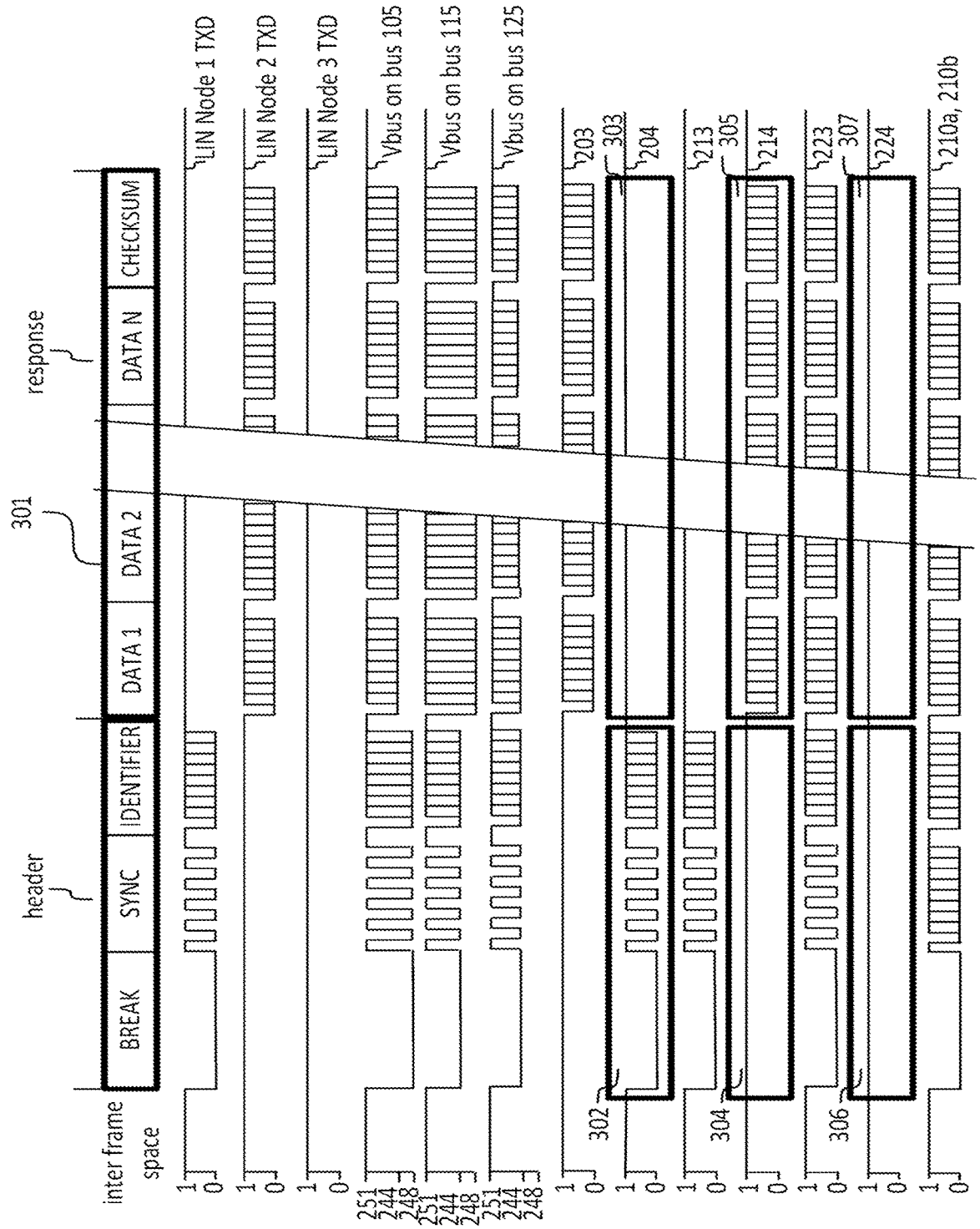
FIG. 9 illustrates LIN frame header transmission performed by a first LIN node and successful frame response transmitted by a second LIN node.

FIG. 9 illustrates LIN frame header transmission performed by the first LIN node 100 and LIN frame response transmitted by the second LIN node 110, and no transmission by the third LIN node 120.

As can be seen in FIG. 9, a LIN frame 301 consists of a so called frame header and a frame response. A BREAK field is used to activate all LIN slaves (i.e. the second LIN node 110 and the third LIN node 120) to listen to the following parts of the header transmitted by a LIN master (i.e. the first LIN node 100 in this case). Hence, the BREAK field acts as a start-of-frame indicator. The header further includes a SYNC field used by the slave nodes for clock synchronization. The IDENTIFER defines a specific message address. Thereafter, the frame response part of the LIN frame commences, which is sent by any one of the slave nodes or the master node, the message response consisting of N bytes of DATA and a CHECKSUM field.

Figure 10:
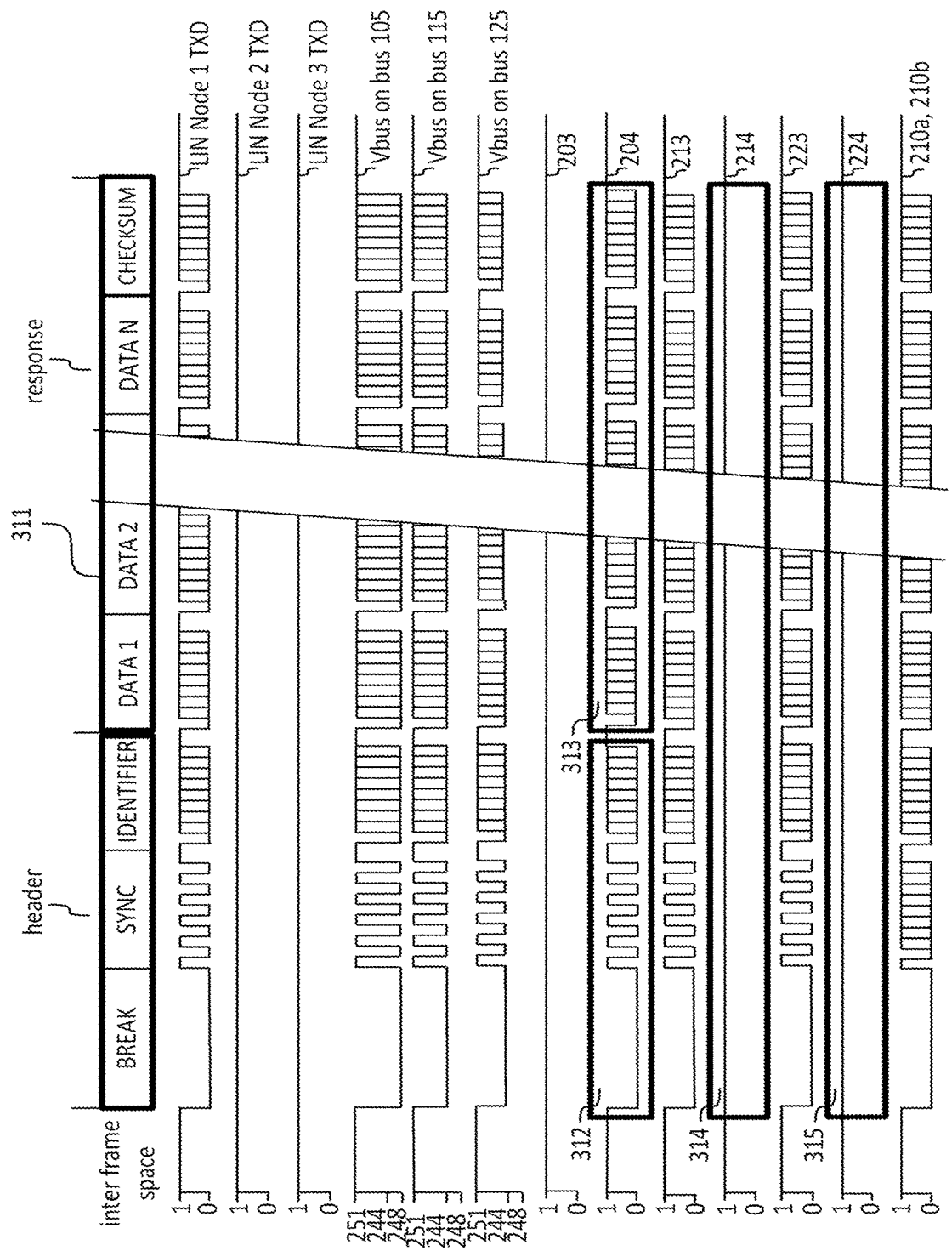
FIG. 10 illustrates LIN frame header transmission and frame response performed by the first LIN node.
Figure 11:
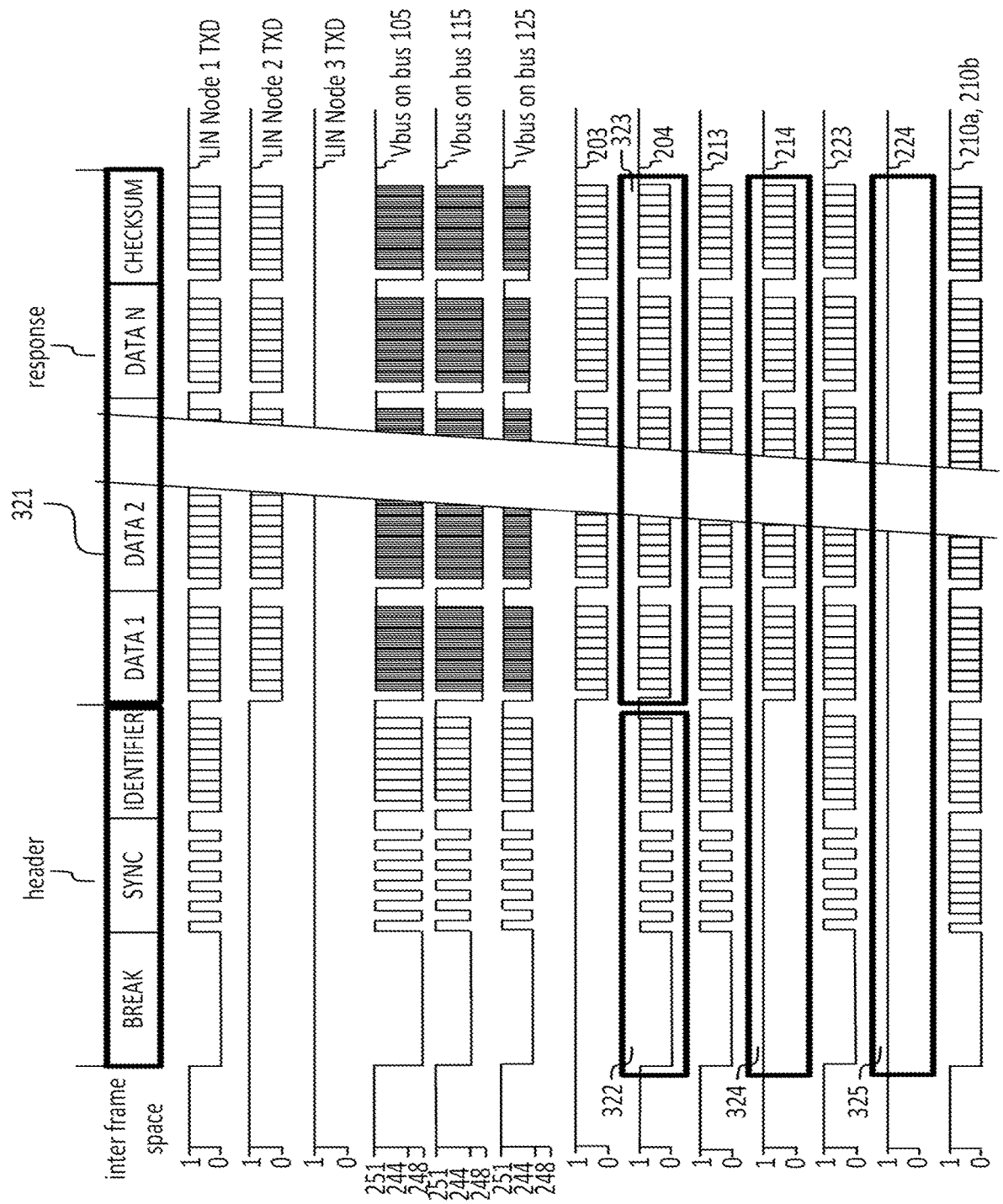
FIG. 11 illustrates LIN frame header transmission performed by the first LIN node and frame response transmitted by the first LIN and the second LIN node resulting in an invalid frame response.

It is noted that in FIGS. 9-11, for illustrative purposes, a part of the DATA field of the respective LIN frame 301, 311, 321 (and the corresponding sections of the remaining signals) has been compressed in time as this field may contain up to 64 bits.

If at the time of detection of the BREAK field any of the RXD' signals over paths 204, 214, 224 is 0 (i.e. dominant), then the corresponding LIN node is identified as being the LIN node transmitting the LIN frame header 302, 304, 306 comprising the data transported with signals 210a or 210b. While both the RXD' signal carried over path 214 for the second LIN node 110 and the RXD' signal carried over path 224 for the third LIN node 120 is 1 (i.e. recessive), the RXD' signal carried over path 204 for the first LIN node 100 is indeed 0. Thus, the first node 100 must be the source of the data received over paths 210a, 210b, in this case a LIN master.

With reference to the voltage $V_{BUS}$ of the signals carried over the LIN buses 105, 115, 125, in this example the first LIN node 100 drives the bus into a dominant state resulting in a $V_{BUS}$ in the range 248 (cf. FIG. 5). The monitoring device 200 will thus conclude that it is the first LIN node 100 that sends the dominant data bit over the first LIN bus 105, and as a result route that dominant bit to the second and the third LIN node 110, 120 via paths 213, 223, respectively, over the second and third LIN bus 115, 125 at a $V_{BUS}$ in the range 244.

The LIN protocol controller 231 will then encode the data sent by the first LIN node 100 and received over path 210a or 210b into a LIN frame headers until all headers fields BREAK, SYNC and IDENTIFIER are encountered.

As can be seen, at the time of the DATA 1 through DATA-N and CHECKSUM fields being encountered in the frame response, LIN bus combination signal 210a or 210b indicates dominant data being transmitted over the LIN buses, and the LIN protocol controller 231 detects from paths 214, 224 only the second node 110 transmitting dominant data thereby successfully completing the LIN frame transmission, indicated with 305.

Again, with reference to the voltage $V_{BUS}$ of the signals carried over the LIN buses 105, 115, 125; at the time of frame response, in this example the second LIN node 110 drive the bus into a dominant state resulting in a $V_{BUS}$ in the range 248. As a result, the monitoring device 200 will route a dominant bit to the first LIN node 100 via path 203 over the first LIN bus 105 at a $V_{BUS}$ in the range 244.

FIG. 10 illustrates frame transmission similar to FIG. 9, but in this case it is the first LIN node 100 that transmits both LIN frame header and LIN frame response. The first LIN node 100 is a LIN master, as the frame header is transmitted by the first LIN node 100. The identification as regards which LIN node is transmitting the frame header is the same is that of FIG. 9.

With reference to the voltage $V_{BUS}$ of the signals carried over the LIN buses 105, 115, 125, in this example the first LIN node 100 drives the bus into a dominant state resulting in a $V_{BUS}$ in the range 248 (cf. FIG. 5). The monitoring device 200 will thus conclude that it is the first LIN node 100 that sends the dominant data bit over the first LIN bus 105, and as a result route that dominant bit to the second and the third LIN node 110, 120 via paths 213, 223, respectively, over the second and third LIN bus 115, 125 at a $V_{BUS}$ in the range 244.

The LIN protocol controller 231 will then encode the data sent by the first LIN node 100 and received over path 210a or 210b into a LIN frame header until all headers fields BREAK, SYNC and IDENTIFIER are encountered.

As can be seen, at the time of the DATA 1 through DATA-N and CHECKSUM fields being encountered in the frame response, LIN bus combination signal 210a or 210b indicates dominant data being transmitted over the LIN buses, and the LIN protocol controller 231 detects from paths 214, 224 only the second node 110 transmitting dominant data thereby successfully completing the LIN frame transmission, indicated with 313.

Again, with reference to the voltage $V_{BUS}$ of the signals carried over the LIN buses 105, 115, 125; at the time of frame response, in this example the first LIN node 100 drive the bus into a dominant state resulting in a $V_{BUS}$ in the range 248. As a result, the monitoring device 200 will route a dominant bit to the second LIN node 110 via path 213 over the second LIN bus 115 at a $V_{BUS}$ in the range 244.

FIG. 11 illustrates a slightly more complex scenario in the form of a LIN frame header transmission performed by the first LIN node 100 and frame response transmitted by the first LIN 100 and the second LIN node 110, resulting in an invalid frame response. A frame response is expected to be transmitted by only one LIN node. Again, up until the frame header of the LIN frame is encountered, the behaviour is the same as that described with reference to FIGS. 9 and 10. Hence the first LIN node 100 is identified as being the LIN node transmission the LIN frame header.

However, after the frame header both the first LIN node 100 and the second LIN node 110 start to transmit a frame response. For simplicity, the byte fields of the frame responses are exactly aligned in time so they are transmitted synchronously. In another example, the byte fields of the first LIN node 100 and second LIN node 110 could be transmitted with slightly different delays relative to each other which would result in invalid byte fields DATA1 trough CHECKSUM.

Due to the wired-AND nature of the LIN transceivers 101, 111, 121 in the LIN nodes and the LIN transceivers 201, 211, 221 in the monitoring device 200, the same bits transmitted by different LIN nodes but with different bit values will result in a logical 0 on buses 105, 115,125 for that bit. Hence, a transmitted bit with logical 1 will be overwritten by a bit with logical value 0, with the resulting value 0 on all LIN buses. That will also occur on the CHECKSUM byte fields transmitted by the first LIN node 100 and by the second LIN node 110. For simplicity, in FIG. 11 the exact bit values in each byte fields DATA 1 trough CHECKSUM are not shown, but the overwriting as such of logical 1 into logical 0 is highlighted on bus-signals 105,115,125. Overwriting of data bits in byte fields is not a normal expected part of LIN frame header or LIN frame response transmission or and is advantageously detected by the LIN monitoring device 200 as an error event.

As a result, any LIN node and also the LIN protocol controller 231 receiving this LIN frame will interpret the CHECKSUM as being incorrect for the DATA 1 trough DATA N fields. The LIN protocol handling device will receive the DATA 1 trough CHECKSUM fields from the combined RXD signal 201a or 210b. However the frame response byte fields DATA 1 trough CHECKSUM will appear as valid byte fields if judged only by the $V_{BUS}$ bus voltages, and not considering the validity of the CHECKSUM, on all buses 105,115,125.

As is understood, numerous use cases may be envisaged. In the following, a brief list of use cases is discussed.
   a. A LIN master transmits a LIN frame header and it needs to be determined which LIN node is the LIN master.
   b. A LIN slave transmits a LIN frame response and it needs to be determined which LIN node is transmitting the LIN frame response.
   c. More than one LIN slave transmit a LIN frame response and it needs to be determined which LIN slave is transmitting the frame responses. If more than one LIN slave transmit frame response this will likely result in that the response becomes invalid, for several reasons, e.g. simply by checksum error.
   d. A LIN slave transmits a wakeup signal and it needs to be determined which LIN slave is transmitting the wakeup signal.
   e. More than one LIN master is connected in the LIN network, which is normally unexpected. LIN network communication thus behaves erratic, and it needs to be determined why there is erratic communication.
   f. A LIN node is disturbing the bus which causes frame reception failure and it needs to be determined which LIN node is disturbing the bus.
   g. A LIN network is woken up. This can be due to a LIN master transmitting LIN frame header or a LIN slave transmitting a wakeup signal and it needs to be determined why the LIN network is woken up.

Figure 12:
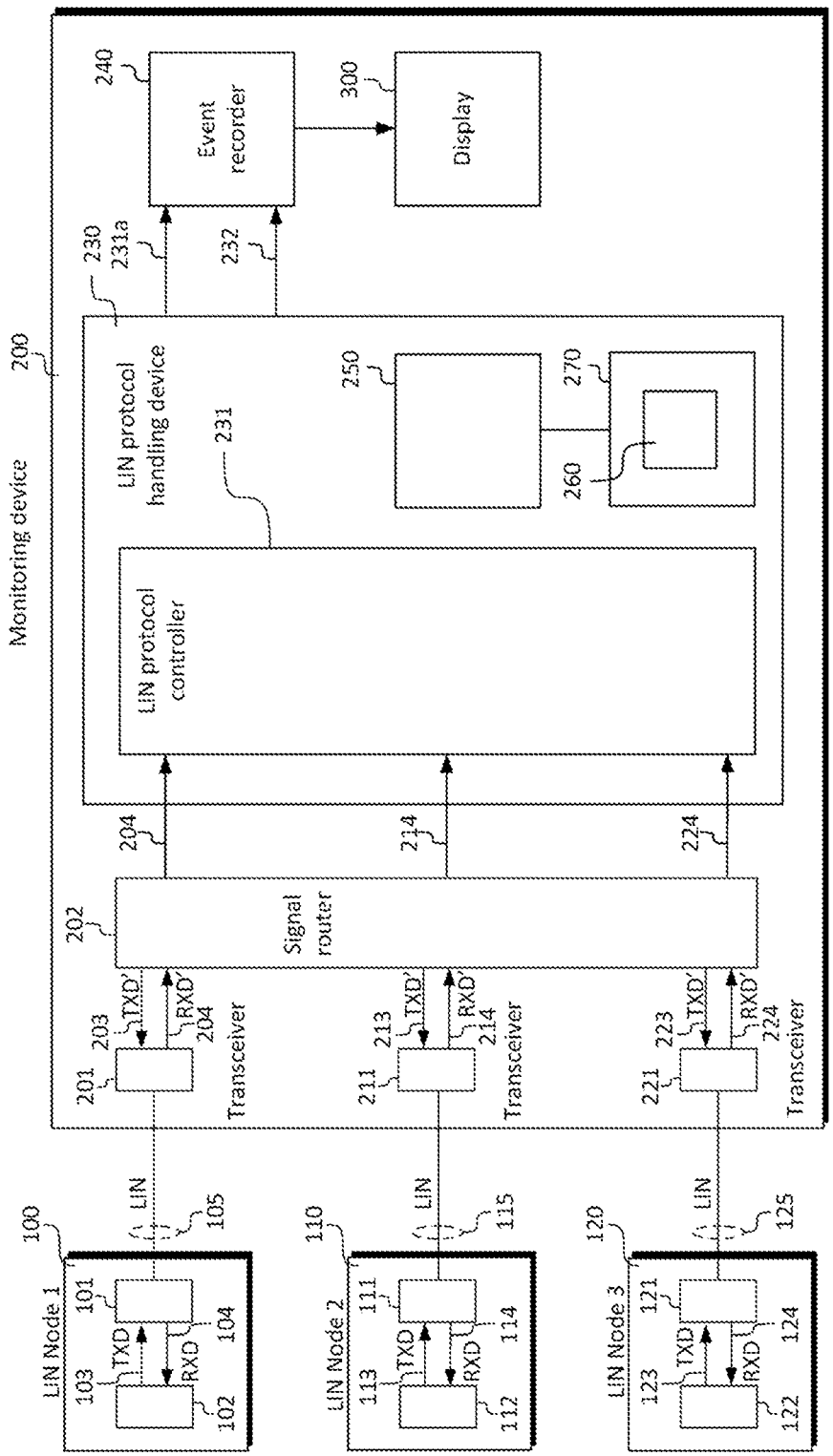
FIG. 12 shows a monitoring device according to a further embodiment.

FIG. 12 shows a monitoring device 200 according to an embodiment comprising the signal router 202 and the LIN protocol controller 231 previously discussed. However, in this embodiment, the monitoring device 200 further comprises a memory 240 where all or a selected part of measurements being performed can be stored and analysed. For instance, statistics may be provided to an operator. Further, individual signals e.g. carried over paths 204, 214, 224, 210a, Or 210b, may be stored for analysis by an operator or a computer.

Further, the monitoring device 200 may be provided with a display 300 where any signal or detected events in the monitoring device 200 may be displayed. In this example, the LIN frames over path 231*a* and events over path(s) 232 are provided for display to an operator of the monitoring device 200.

Further, the monitoring device 200 comprises one or more processing units 250 in which the functionality of the monitoring device 200 may be implemented. Typically, all functionality of the monitoring device 200 (except for the display 300) may be carried out by such processing unit(s) 250, such as that of the transceivers 201, 211, 221, the signal router 202, the LIN protocol controller 231, etc.

The steps of the method of the monitoring device 200 for monitoring a plurality of LIN buses according to embodiments may thus in practice be performed by the processing unit 250 embodied in the form of one or more microprocessors arranged to execute a computer program 260 downloaded to a suitable storage medium 270 associated with the microprocessor, such as a Random Access Memory (RAM), a Flash memory or a hard disk drive. The processing unit 250 is arranged to cause the monitoring device 200 to carry out the method according to embodiments when the appropriate computer program 260 comprising computer-executable instructions is downloaded to the storage medium 270, being e.g. a non-transitory storage medium, and executed by the processing unit 250. The storage medium 252 may also be a computer program product comprising the computer program 260. Alternatively, the computer program 260 may be transferred to the storage medium 270 by means of a suitable computer program product, such as a Digital Versatile Disc (DVD) or a memory stick. As a further alternative, the computer program 260 may be downloaded to the storage medium 270 over a network. The processing unit 250 may alternatively be embodied in the form of a digital signal processor (DSP), an application specific integrated circuit (ASIC), a field-programmable gate array (FPGA), a complex programmable logic device (CPLD), etc.

In one embodiment, the LIN transceivers of 201, 211, 221, are Integrated Circuit (IC) packaged devices with a transmitter (bus driver) and a receiver (bus line receiver) in the same IC package. In another embodiment the transceivers may be constructed by a plurality of passive components and by linear or digital semiconductor components.

In an embodiment, the LIN transceivers of 201, 211, 221 can have at least two configurations of the bus driver output voltage and bus comparator input thresholds, where one selected configurations of a plurality of configuration is in operation. For example, one configuration can be according to FIG. 2, and another configuration can be according to right side of FIG. 5. There is provided a configuration selection input, in one example in the form of digital selection input pin, in another example there is a serial peripheral interface (SPI) bus.

In one embodiment at least two LIN buses of 105, 115, 125, and at least two transceivers of 201, 211, 221, and the signal router 202 is part of a LIN bus repeater or LIN bus extender.

In a further embodiment two of LIN buses 105, 115, 125 and two of transceivers 201, 211, 221 are used with a simplified signal router 202. The signal router does not need to have encoder 206, 216, 226. Encoder 205 is an encoder with two inputs, one being RXD' output 204 of a first transceiver and one being RXD' output 214 of a second transceiver. The signal routing is simplified compared to FIG. 7; RXD' output 204 of a first transceiver is directly connected to a TXD' input 213 of a second transceiver, and connected directly to a LIN protocol handling device 230. RXD' output 214 of a second transceiver is directly connected to a TXD' 203 of a first transceiver, and connected directly to a LIN protocol handling device 230.

In a further embodiment at least LIN buses 105, 115, 125, and at least transceivers of 201, 211, 221, and the signal router 202 are part of a LIN active star coupler.

In a further embodiment some or all parts of monitoring device 200 is part of a digital storage oscilloscope with serial bus protocol decoding.

An approach in LIN analysis is to passively and non-intrusively monitor the LIN nodes. This may require extended monitoring time in order to gather sufficient data about the LIN nodes. However, time available for monitoring may be limited and not enough in some scenarios. In a system of LIN nodes, there may be additional conditions caused by other nodes of the system, which affect node operation. Those conditions may not necessarily occur if performing a standalone LIN node test during e.g. LIN conformance verification. Therefore, in an embodiment, an approach is to actively generate and transmit signals over the LIN bus causing a desired result, and to monitor any LIN nodes in operation, e.g. error conditions of the LIN nodes.

LIN nodes receiving the exact same bit-stream of LIN data frames handle errors in the data link layer in the same way.

Conversely, LIN nodes not receiving the exact same bit-stream of LIN data frames may handle errors in the data link layer in different ways. This may happen in e.g. harsh electrical environments such as e.g. motor vehicles, or because of a compromised bus topology, due to LIN bus signal integrity problems. Hence, a certain LIN ECU may or may not be the only LIN node to detect an error.

To evaluate a specific LIN node data link layer operation while detecting errors in a LIN system, two main scenarios are of interest:
  i. the specific LIN node is the only node to detect a data link error and perform a predetermined action in application layer. Other LIN nodes do not detect an error, and
  ii. at least one other LIN node detects a data link error and performs a predetermined action in application layer.

LIN nodes that do not receive the exact same application signals in a data field of a LIN data frame may handle manipulated signals in different ways or at different instants of time of associated bits in the stream.

To evaluate a specific LIN node application layer operation while receiving manipulated signals in a LIN system, two main scenarios are of interest:
  i. the specific LIN node is the only node to receive a manipulated signal in a data field, while other LIN nodes receive non-manipulated signals, and
  ii. all LIN nodes receive a manipulated signal in a data field.

Figure 13:
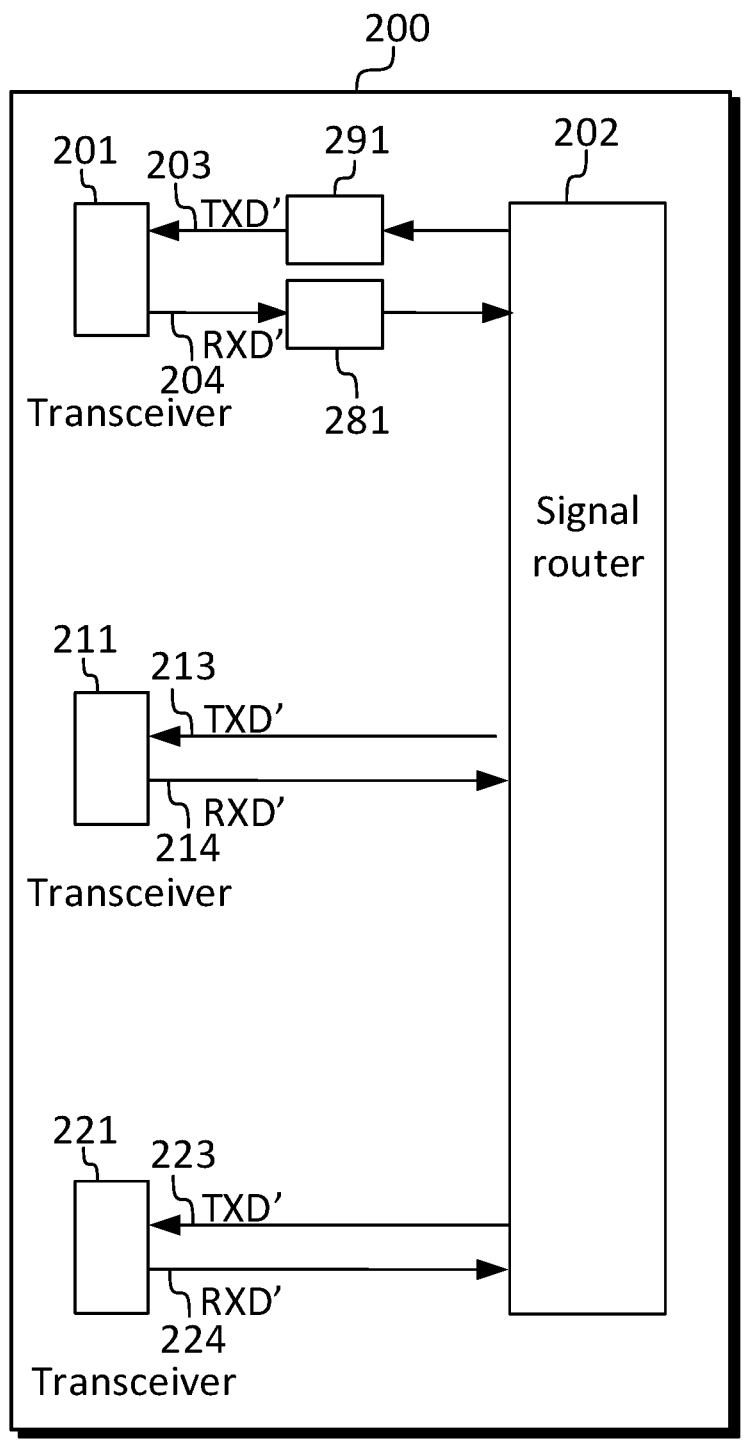
FIG. 13 illustrates a monitoring device according to another embodiment.

FIG. 13 illustrates a monitoring device 200 according to an embodiment comprising a first bit-stream manipulation module 281 connected in the RXD' path 204 and a second bit-stream manipulation module 291 connected in the TXD' path 203 between a transceiver 201 and a signal router 202. The modules 281, 291 are controlled to handle bit manipulation of LIN frame to and from one or more LIN nodes 100, 110, 120 (not shown in FIG. 13).

The first bit-stream manipulation module 281 may optionally be controlled to modify bits in a received LIN data frame from the LIN transceiver 201 and the first LIN node 100 before passing the frame to the signal router 202. The activation or deactivation of manipulation may be based on a LIN frame identifier in an arbitration field, i.e. a certain bit position in a LIN frame. The manipulation may introduce a data link error, e.g. a checksum error. This manipulation will cause the second and third LIN nodes 110, 120 to receive manipulated LIN frames, and the second and third LIN nodes 110, 120 are expected to detect error. The first bit-stream manipulation module 281 may be equipped with a manipulation configuration memory, and/or a software executable instruction or similar.

The second bit-stream manipulation module 291 may optionally be controlled to modify bits in a received LIN data frame from the signal router 202 before passing the frame to the LIN transceiver 201 and the first LIN node 100. The manipulation can be based on detecting a specific value of a received identifier, i.e. a certain bit position in a LIN frame. The manipulation may introduce a data link error e.g. a checksum error. This manipulation will cause the first LIN node 100 to receive manipulated LIN frames, and the first LIN node 100 is expected to detect errors.

LIN frames contain a cyclic redundancy checksum so that a receiver of the frames can validate the received frame as having no data link layer errors and therefore being correctly received or alternatively having errors (there is an eight-bit checksum field). This results in a certain degree of tolerance to some minor modification of the bit-stream (including e.g. data field) for which the checksum is calculated, where the resulting modified data field will result in an identical checksum as before the modification. However, this is in most situations unlikely. A majority of possible modifications of only a data field of a LIN frame will have as a consequence that such frame will be rendered invalid (and cause a checksum error), unless the checksum is properly modified as well.

The first bit-stream manipulation module 281 may optionally be controlled to modify bits in a data field and a checksum field of a received LIN frame from the LIN transceiver 201 and the first LIN node 100 before passing the manipulated LIN frame to the signal router 202. If the data field is modified, then it is likely that in order for the frame to still be rendered valid and considered as having no checksum error by receiving LIN node 110, 120, the checksum need to be recalculated and the checksum field modified as well. No errors are induced on data link layer. The manipulation can be based on detecting a specific value of a received identifier, receiving a specific signal value in a data field, or a certain bit position in a LIN data frame. The manipulation can be based on a LIN database where position and size of a signal in a LIN data field is defined. The first module 281 may recalculate a new correct checksum based on the resulting manipulated content of data field, as well as other preceding frame fields that are used for checksum calculation and replace the checksum field.

It is noted that the first bit-stream manipulation module 281 may be implemented using a full LIN protocol controller in order to decode received frames and encode new or modified frames passed on to the signal router 202.

The second bit-stream manipulation module 291 may optionally be controlled to modify bits in a data field and a checksum field of a received LIN frame from the signal router 202 before passing the manipulated LIN frame to the LIN transceiver 201 and the first LIN node 100. If data field is modified, then it is likely that in order for the frame to still be rendered valid and considered as having no checksum error by the receiving first LIN node 100, the checksum need to be recalculated and checksum field modified as well. No errors are induced on data link layer. The manipulation can be based on detecting a specific value of a received identifier in an arbitration field, receiving a specific signal value in a data field, or a certain bit position in a LIN frame. The manipulation can be based on a LIN database where position and size of a signal in a LIN data field is defined. The second module 291 may recalculate a new correct checksum based on the resulting manipulated content of data field, as well as other preceding frame fields that are used for checksum calculation and replace the checksum field.

It is noted that the second bit-stream manipulation module 291 may be implemented using a full LIN protocol controller in order to decode received frames and encode new or modified frames passed on to the LIN transceiver 201.

Further, only first and second bit-stream manipulation modules 281, 291 are shown in FIG. 13. However, the monitoring device 200 may also comprise corresponding bit-stream manipulation modules between transceivers 211, 221 and the signal router 202, respectively similar to 281, 291 also between LIN transceivers 211,221 and signal router 202. While the bit-stream manipulation modules 281, 291 modify the bit-stream, the LIN nodes 100, 110, 120 can be monitored by the LIN protocol handling device 230 as described previously.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims. Example of other embodiments are other one-wire or single ended bus systems than LIN, where at least two bus states exist and using transceivers with other transmitted bus voltage levels and receiving thresholds, and other data link layer protocols and other protocol specific events.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of a monitoring device of monitoring a plurality of Local Interconnect Network (LIN) buses, wherein at least one LIN node is connected to each LIN bus, said plurality of LIN buses being interconnected via the monitoring device, the method comprising:

detecting, for each LIN bus, any dominant data being sent over said each LIN bus by a LIN node connected to said each LIN bus; and routing said any dominant data received by the monitoring device over said each LIN bus to all remaining LIN buses without overwriting any dominant data sent over the remaining LIN buses, the LIN nodes being configured to output dominant data over the LIN buses at a voltage level which is in a first range complying with a required transmit voltage range for dominant data stipulated by LIN standard, while the monitoring device is configured to output dominant data over the LIN buses at a voltage level which is in a second range complying with the required transmit voltage range for dominant data stipulated by LIN standard but which second range is configured to be at a higher voltage than, and not overlap with, the first range, and configured to receive dominant data at a voltage level at least being in the range with which the LIN nodes are configured to output dominant data, wherein the detecting of any dominant data sent over said each LIN bus by a LIN node comprises:

detecting whether a voltage level of data being sent over said each LIN bus is within said first range, in which case a LIN node is detected to send dominant data over said each LIN bus; wherein the routing of data received by the monitoring device over said each LIN bus to all remaining LIN buses comprises:
routing the dominant data at a voltage level being within said second range.

2. The method of claim 1, further comprising:
routing, if no dominant data is detected to have been sent by a LIN node connected to said each LIN bus and the monitoring device is not sending dominant data, recessive data at a voltage level complying with a required receiver voltage range for recessive data as stipulated by the LIN standard.

3. The method of claim 1, further comprising, before routing the data to the LIN nodes:
encoding, for each LIN bus, the data received over the remaining LIN buses such that an output of the encoding represents dominant data if any one or more of inputs to the encoding represents dominant data and represents recessive data if all inputs to the encoding represents recessive data.

4. The method of claim 3, further comprising:
encoding the data received over the LIN buses such that an output of the encoding represents dominant data if any one or more of inputs to the encoding represents dominant data and represents recessive data if all inputs to the encoding represents recessive data.

5. The method of claim 4, further comprising:
encoding, the data received over the LIN buses into one or more LIN protocol symbols;
identifying, from the data representing the data sent over the LIN buses, to which one or more of the LIN nodes the data being encoded into one or more LIN protocol symbols belongs.

6. The method of claim 5, wherein the identifying of the one or more of the LIN nodes to which the data representing the data sent over the LIN buses belongs comprises:
detecting a start-of-frame indicator in the data representing the data sent over the LIN buses indicating a start of a LIN frame in which the data is to be encoded.

7. The method of claim 1, further comprising:
displaying any data monitored in the monitoring device.

8. The method of claim 1, further comprising:
manipulating data sent over at least one of the LIN buses to cause a desired result on the remaining LIN buses and/or manipulating data received over at least one of the LIN buses.

9. A monitoring device configured to monitor a plurality of Local Interconnect Network (LIN) buses, wherein at least one LIN node is connected to each LIN bus, said plurality of LIN buses being interconnected via the monitoring device, which monitoring device comprises a processing unit and a memory, said memory containing instructions executable by said processing unit, whereby the monitoring device is operative to:
detect, for each LIN bus, any dominant data being sent over said each LIN bus by a LIN node connected to said each LIN bus; and
route said any dominant data received by the monitoring device over said each LIN bus to all remaining LIN buses without overwriting any dominant data sent over the remaining LIN buses, the LIN nodes being configured to output dominant data over the LIN buses at a voltage level which is in a first range complying with a required transmit voltage range for dominant data stipulated by LIN standard, while the monitoring device is configured to output dominant data over the LIN buses at a voltage level which is in a second range complying with the required transmit voltage range for dominant data stipulated by LIN standard but which second range is configured to be at a higher voltage than, and not overlap with, the first range, and configured to receive dominant data at a voltage level at least being in the range with which the LIN nodes are configured to output dominant data, wherein, to detect any dominant data sent over said each LIN bus by a LIN node, the monitoring unit is operative to:
detect whether a voltage level of data being sent over said each LIN bus is within said first range, in which case a LIN node is detected to send dominant data over said each LIN bus; wherein, to route data received by the monitoring device over said each LIN bus to all remaining LIN buses, the monitoring unit is operative to:
route the dominant data at a voltage level being within said second range.

10. The monitoring device of claim 9, further being operative to:
route, if no dominant data is detected to have been sent by a LIN node connected to said each LIN bus and the monitoring device is not sending dominant data, recessive data at a voltage level complying with a required receiver voltage range for recessive data as stipulated by the LIN standard.

11. The monitoring device of claim 9, further being operative to, before routing the data to the LIN nodes:
encode, for each LIN bus, the data received over the remaining LIN buses such that an output of the encoding represents dominant data if any one or more of inputs to the encoding represents dominant data and represents recessive data if all inputs to the encoding represents recessive data.

12. The monitoring device of claim 11, further being operative to:
encode the data received over the LIN buses such that an output of the encoding represents dominant data if any one or more of inputs to the encoding represents dominant data and represents recessive data if all inputs to the encoding represents recessive data.

13. The monitoring device of claim 12, further being operative to:
encode, the data received over the LIN buses into one or more LIN protocol symbols;
identify, from the data representing the data sent over the LIN buses, to which one or more of the LIN nodes the data being encoded into one or more LIN protocol symbols belongs.

14. The monitoring device of claim 12, further being operative to, when identifying the one or more of the LIN nodes to which the data representing the data sent over the LIN buses belongs:
detect a start-of-frame indicator in the data representing the data sent over the LIN buses indicating a start of a LIN frame in which the data is to be encoded.

15. The monitoring device of claim 9, further being operative to:
display any data monitored in the monitoring device.

16. The monitoring device of claim 9, further being operative to:

manipulate data sent over at least one of the LIN buses to cause a desired result on the remaining LIN buses and/or manipulate data received over at least one of the LIN buses.

17. A computer-readable storage medium storing instructions that, when executed, cause a processing unit of a monitoring device to monitor a plurality of Local Interconnect Network (LIN) busses, wherein the instructions that cause the processing unit to monitor the LIN busses comprise instructions that cause the processing unit to:

detect, for each LIN bus, any dominant data being sent over said each LIN bus by a LIN node connected to said each LIN bus; and route said any dominant data received by the monitoring device over said each LIN bus to all remaining LIN buses without overwriting any dominant data sent over the remaining LIN buses, the LIN nodes being configured to output dominant data over the LIN buses at a voltage level which is in a first range complying with a required transmit voltage range for dominant data stipulated by LIN standard, while the monitoring device is configured to output dominant data over the LIN buses at a voltage level which is in a second range complying with the required transmit voltage range for dominant data stipulated by LIN standard but which second range is configured to be at a higher voltage than, and not overlap with, the first range, and configured to receive dominant data at a voltage level at least being in the range with which the LIN nodes are configured to output dominant data, wherein the instructions that cause the processing unit to detect any dominant data sent over said each LIN bus by a LIN node comprise instructions that cause the processing unit to:

detect whether a voltage level of data being sent over said each LIN bus is within said first range, in which case a LIN node is detected to send dominant data over said each LIN bus; wherein the instructions that cause the processing unit to route data received by the monitoring device over said each LIN bus to all remaining LIN buses comprise instructions that cause the processing unit to:

route the dominant data at a voltage level being within said second range.

18. The computer-readable storage medium of claim 17, further comprising instructions that cause the processing unit to:

manipulate data sent over at least one of the LIN buses to cause a desired result on the remaining LIN buses and/or manipulate data received over at least one of the LIN buses.

* * * * *